United States Patent
Oohira et al.

(10) Patent No.: US 10,664,182 B2
(45) Date of Patent: May 26, 2020

(54) STORAGE SYSTEM

(71) Applicant: Hitachi, Ltd., Tokyo (JP)

(72) Inventors: Yoshinori Oohira, Tokyo (JP); Nobuhiro Maki, Tokyo (JP); Wataru Okada, Tokyo (JP); Tadashi Takeuchi, Tokyo (JP); Sachie Tajima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 151 days.

(21) Appl. No.: 15/543,308

(22) PCT Filed: Jan. 29, 2015

(86) PCT No.: PCT/JP2015/052568
§ 371 (c)(1),
(2) Date: Jul. 13, 2017

(87) PCT Pub. No.: WO2016/121066
PCT Pub. Date: Aug. 4, 2016

(65) Prior Publication Data
US 2018/0004447 A1    Jan. 4, 2018

(51) Int. Cl.
*G06F 3/06* (2006.01)
*G06F 9/46* (2006.01)

(52) U.S. Cl.
CPC .......... *G06F 3/0631* (2013.01); *G06F 3/0604* (2013.01); *G06F 3/0605* (2013.01);
(Continued)

(58) Field of Classification Search
CPC ...... G06F 3/0629; G06F 3/0631; G06F 3/064; G06F 3/0605; G06F 3/0665; G06F 3/067;
(Continued)

(56) References Cited

U.S. PATENT DOCUMENTS

| 8,612,989 B1 * | 12/2013 | Richards | G06F 9/5027 |
| | | | 718/105 |
| 2002/0194251 A1 * | 12/2002 | Richter | G06F 9/5011 |
| | | | 718/105 |

(Continued)

FOREIGN PATENT DOCUMENTS

| JP | 2008-257572 A | 10/2008 |
| JP | 2011-128706 A | 6/2011 |

OTHER PUBLICATIONS

International Search Report of PCT/JP2015/052568 dated Mar. 24, 2015.

*Primary Examiner* — William E. Baughman
(74) *Attorney, Agent, or Firm* — Mattingly & Malur, PC

(57) ABSTRACT

The storage system is capable of creating one or more virtual storage subsystems to which virtual resources having logically divided a processing capacity of the physical resources are allocated, and upon creating a virtual volume for receiving I/O requests from the host within the virtual storage subsystem, the virtual storage subsystem allocates the virtual resource to the virtual volume, and when an I/O request to the virtual volume is received from the host, performs processing related to the I/O request using the virtual resource having been allocated. According further to the storage system, after allocating the virtual resource to the virtual volume, the storage system raises a utilization rate of the virtual resource allocated to the virtual volume in a stepwise manner.

6 Claims, 30 Drawing Sheets

(52) U.S. Cl.
CPC ............ *G06F 3/067* (2013.01); *G06F 3/0665*
(2013.01); *G06F 3/0685* (2013.01); *G06F*
*9/46* (2013.01)

(58) Field of Classification Search
CPC ...... G06F 3/0685; G06F 3/0608; G06F 3/061;
G06F 3/0617; G06F 9/46; G06F 9/50;
G06F 9/5061; G06F 9/5077
USPC ....... 711/172, 173, 163, 158, 147, 153, 148,
711/150, 151, 152, 129, 130, 111, 103,
711/118; 718/104, 105; 713/100
See application file for complete search history.

(56) References Cited

U.S. PATENT DOCUMENTS

| | | | |
|---|---|---|---|
| 2008/0098194 A1* | 4/2008 | Hashimoto | G06F 1/3221 |
| | | | 711/173 |
| 2008/0222646 A1* | 9/2008 | Sigal | G06F 9/505 |
| | | | 718/105 |
| 2008/0250219 A1 | 10/2008 | Shimada | |
| 2010/0030877 A1* | 2/2010 | Yanagisawa | G06F 9/5077 |
| | | | 709/221 |
| 2010/0138627 A1* | 6/2010 | Ossia | G06F 3/0619 |
| | | | 711/171 |
| 2011/0185062 A1* | 7/2011 | Foege | G06F 9/5077 |
| | | | 709/226 |
| 2011/0239215 A1* | 9/2011 | Sugai | G06F 9/45558 |
| | | | 718/1 |
| 2012/0173838 A1* | 7/2012 | Noll | G06F 3/0605 |
| | | | 711/170 |
| 2014/0137110 A1* | 5/2014 | Engle | G06F 9/5022 |
| | | | 718/1 |
| 2014/0189109 A1* | 7/2014 | Jang | H04L 67/10 |
| | | | 709/224 |

\* cited by examiner

Fig. 5

| VS# (501) | VVOL# (502) | Target resource utilization rate (504) | Priority order (505) |
|---|---|---|---|
| 000 | 000<br>001<br>002 | 50 % | 1 |
| 001 | 003 | 40 % | 2 |
| 002 | 004<br>005 | 20 % | 3 |

Virtual storage setting management table
410

Fig. 6

| VS# (601) | Virtual port configuration (602) | Virtual processor configuration (603) | Virtual memory configuration (604) | Virtual media configuration (605) |
|---|---|---|---|---|
| 000 | 4Gbps x 2 | 2.1 GHz x 0.2 | 10GB | HDD x 2 |
| 001 | 8Gbps x 1 | 2.3 GHz x 1 | 200GB | SSD x 3 |
| 002 | 4Gbps x 3 | 2.1 GHz x 2 | 200MB | HDD x 4 |

Virtual storage configuration management table
411

Fig. 7

Virtual volume configuration management table 412

| VVOL# | Volume size | Physical volume number | Target performance |
|---|---|---|---|
| 000 | 100 GB | 001 | 100iops |
| 001 | N/A | N/A | N/A |
| 002 | 50 GB | 002 | 300iops |

Fig. 8

Physical volume configuration management table 413

| Physical volume number | Volume size | Concerned port number | Concerned processor number | Concerned memory number | Concerned media number |
|---|---|---|---|---|---|
| 000 | 100GB | 000 | 001 | 100 | HDD100 |
| 001 | N/A | N/A | N/A | N/A | N/A |
| 002 | 50GB | 100 | 100 | 200 | SSD100 |

Fig. 9

Virtual volume monitor table 414

| VVOL# | Throughput performance | Response performance |
|---|---|---|
| 000 | 100 IOPS | 10 ms |
| 001 | 200 IOPS | 20 ms |
| 002 | 30 IOPS | 30 ms |

Physical resource amount management table
415

Virtual resource amount management table
416

| VS# | VVOL# | Resource classification | Resource number | Resource occupancy | Shared resource occupancy | Virtual resource utilization rate |
|---|---|---|---|---|---|---|
| 000 | 000 | Port | 000 | 10% | 0% | 70% |
| | 001 | | 001 | 20% | 20% | 20% |
| | ... | | ... | ... | ... | ... |
| | 000 | Processor | 000 | 50% | 50% | 40% |
| | 001 | | 001 | 20% | 20% | 10% |
| | ... | | ... | ... | ... | ... |
| | 000 | Memory | 000 | 30% | 30% | 20% |
| | 001 | | 001 | 30% | 30% | 40% |
| | ... | | ... | ... | ... | ... |
| | 000 | Media | HDD002 | 60% | 60% | 50% |
| | 001 | | SSD100 | 30% | 30% | 10% |
| | ... | | ... | ... | ... | ... |
| | | ... | ... | ... | ... | ... |

Fig. 15
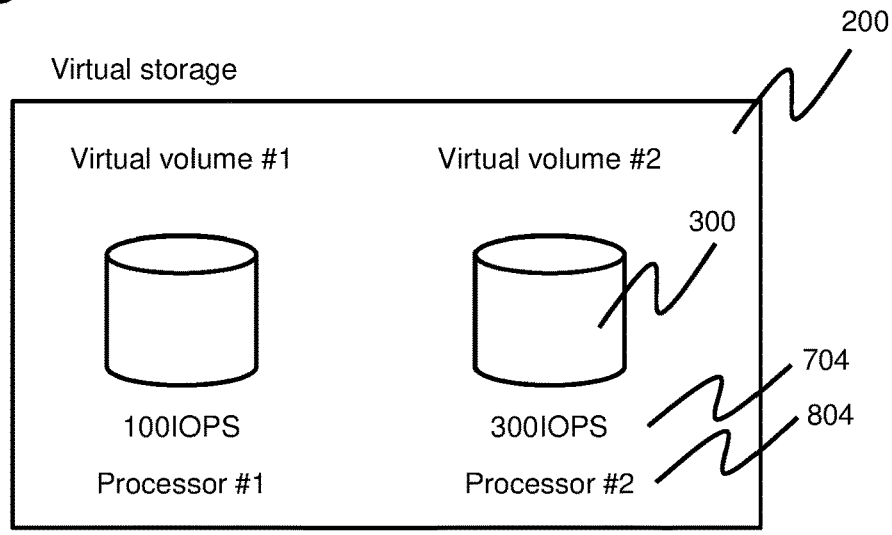
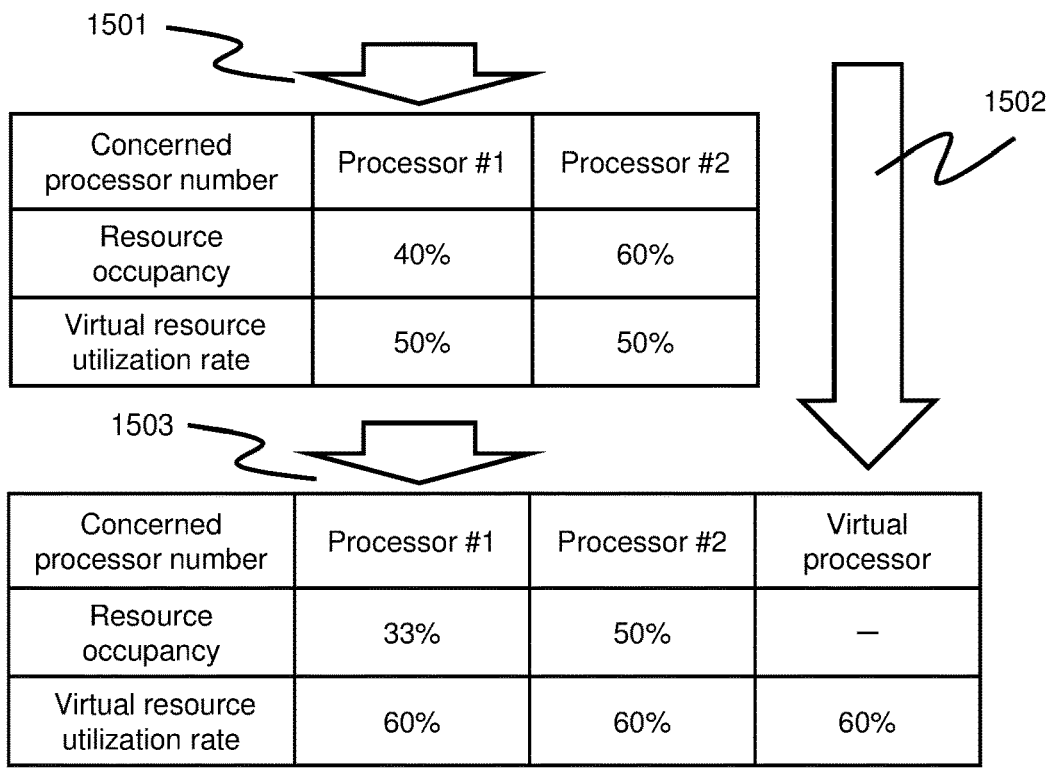

Fig.19

| VVOL# | Volume size | Virtual LBA | Physical volume number | Physical LBA |
|---|---|---|---|---|
| 000 | 100GB | 0−99 | 100 | 200−299 |
| | | 100−199 | 100 | 300−399 |
| | | ... | ... | ... |
| 001 | N/A | 0−99 | N/A | N/A |
| | | 100−199 | N/A | N/A |
| | | ... | ... | ... |
| 002 | 100GB | 0−99 | 100 | 500−599 |
| | | 100−199 | N/A | N/A |
| | | ... | ... | ... |

2001　2002　2003　2004　2005

Virtual volume configuration management table

413

Physical volume configuration management table 414

Fig.21
Virtual volume monitor table
415

Fig. 25

| VS# | Virtual port configuration | Virtual processor configuration | Virtual memory configuration | Virtual media configuration |
|---|---|---|---|---|
| 000 | 4Gbps x 2 | 2.1 GHz x 0.2 | 10GB | (HDD+SSD) x 2 |
| 001 | 8Gbps x 1 | 2.3 GHz x 1 | 200GB | (HDD+SSD) x 3 |
| 002 | 4Gbps x 3 | 2.1 GHz x 2 | 200MB | (HDD+SSD) x 4 |

Virtual storage configuration management table

411

| Concerned media number | SSD#1 | HDD#1 | Virtual media |
|---|---|---|---|
| Throughput performance (total sum) | 100 IPOS | 200 IPOS | 300 IPOS |
| Average response performance | 1 ms | 6 ms | 4.3 ms |

2701 ⬇

| Concerned media number | SSD#1 | HDD#1 | Virtual media |
|---|---|---|---|
| Throughput performance (total sum) | 60 IPOS | 240 IPOS | 300 IPOS |
| Average response performance | 1 ms | 6 ms | 5 ms |

Fig. 32

| Virtual volume number (3101) | Function classification (3102) | Function state (3103) |
|---|---|---|
| 000 | Deduplication | 30% |
| 001 | N/A | N/A |
| 002 | Volume copy (Primary Volume) | Copying |
|  | Compression | Compressed |

Storage function state management table
417

Fig. 33

| Applied classification | Function state | Port correction factor | Processor correction factor | Memory correction factor | Media correction factor |
|---|---|---|---|---|---|
| Volume copy (Primary Volume) | Init | 0% | 0% | 0% | 0% |
| | Copying | 10% | 10% | 0% | 10% |
| | Paired | 10% | 5% | 0% | 0% |
| | Suspended | 0% | 0% | 0% | 0% |
| | Restored | 10% | 20% | 10% | 20% |
| Volume copy (Secondary Volume) | Init | 0% | 0% | 0% | 0% |
| | Copying | 10% | 10% | 0% | 10% |
| | Paired | 10% | 5% | 0% | 0% |
| | Suspended | 0% | 0% | 0% | 0% |
| | Restored | 10% | 20% | 10% | 20% |
| Deduplication | 0% | 0% | 0% | 0% | 0% |
| | 1%–10% | 0% | 3% | 3% | 0% |
| | 11%–20% | 0% | 6% | 6% | 0% |
| | ... | ... | ... | ... | ... |
| Compression | Not compressed | 0% | 0% | 0% | 0% |
| | Compressed | 0% | 20% | 10% | 0% |
| ... | ... | ... | ... | ... | ... |

Storage function state correction table

418

STORAGE SYSTEM

TECHNICAL FIELD

The present invention relates to a performance management technique of a storage system.

BACKGROUND ART

In the cloud environment, the importance of a tenant-unit performance management technique is increasing, and along therewith, the importance of a performance management technique of a storage configuring a tenant is increasing even further. On the other hand, along with the recent advancement of a storage virtualization technique, it has become possible for administrators without any specialized knowledge on storage to manage storage. In view of the above-described technical background, it has become important to provide a performance management technique of a virtual storage adopting the storage virtualization technique.

As an example of the performance management technique of a storage system, there is a technique for preventing performance influenced among applications, by enabling a user to set an occupied resource amount regarding respective physical resources (such as ports and caches) of the storage system. On the other hand, there are other techniques, such as a thin provisioning technique or a tiering technique as storage virtualization technique, where the storage system automatically determines the appropriate media for storing data, to thereby enable users without specialized knowledge to manage the storage system.

SUMMARY OF INVENTION

Technical Problem

One of the problems of the performance management technique targeting virtual storages is that, when setting the occupied resource amount for performance management, it is difficult for the user to determine how much occupied resource amount is required in each physical resource. In other words, it is difficult for the user to set a minimum necessary occupied resource amount for achieving the target performance.

Another problem of the performance management technique targeting virtual storages is that, when a virtual storage is configured of a plurality of physical resources, even if the minimum necessary occupied resource amount could be set in each physical resource, the biasing of processing loads to the respective physical resources may change, based on which the occupied resource amount of a specific physical resource may become insufficient, and the target performance may not be achieved.

Solution to Problem

The storage system according to the present invention includes a storage controller having multiple types of physical resources used for processing I/O requests from a host, and a media resource for storing data. The types of physical resources include, at least, a processor resource, a memory resource, and a port resource connected to the host. The storage system is capable of forming one or more virtual storage subsystems to which virtual resources having logically divided a processing capacity of the physical resources are allocated, and when creating a virtual volume receiving I/O requests from the host within the virtual storage subsystem, the virtual resource is allocated to the virtual volume, and when an I/O request to the virtual volume is received from the host, the system executes processing of the I/O request using the allocated virtual resource. Further, the storage system allocates a virtual resource to the virtual volume, and then raises a utilization rate of the virtual resource being allocated to the virtual volume in a stepwise manner.

Advantageous Effects of Invention

The present invention enables to perform performance management targeting virtual storages, and enables to cut down performance management costs.

BRIEF DESCRIPTION OF DRAWINGS

FIG. 5 is a configuration diagram of a virtual storage setting management table according to Embodiment 1.

FIG. 6 is a configuration diagram of a virtual storage configuration management table according to Embodiment 1.

FIG. 7 is a configuration diagram of a virtual volume configuration management table according to Embodiment 1.

FIG. 8 is a configuration diagram of a physical volume configuration management table according to Embodiment 1.

FIG. 9 is a configuration diagram of a virtual volume monitor table according to Embodiment 1.

FIG. 15 is a schematic diagram of processing of a resource reallocation program according to Embodiment 1.

FIG. 19 is a configuration diagram of a virtual volume configuration management table according to Embodiment 2.

FIG. 21 is a configuration diagram of a virtual volume monitor table according to Embodiment 2.

FIG. 25 is a configuration diagram of a virtual storage configuration management table according to Embodiment 3.

FIG. 32 is a configuration diagram of a storage function state management table according to Embodiment 4.

FIG. 33 is a configuration diagram of a storage function state correction table according to Embodiment 4.

DESCRIPTION OF EMBODIMENTS

<Embodiment 1>

Figure 1:
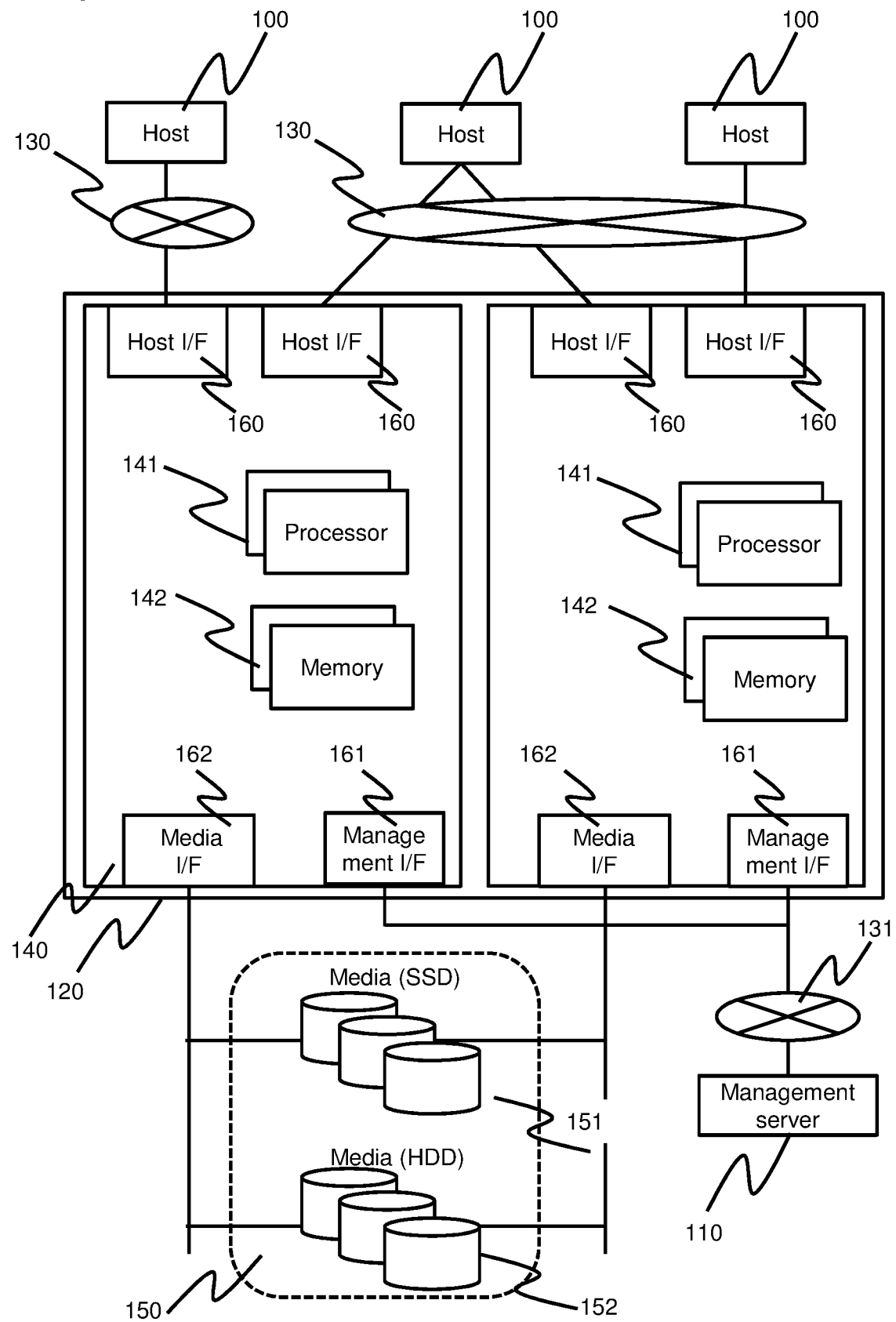
FIG. 1 illustrates a system configuration diagram according to the present invention.

FIG. 1 is a block diagram schematically illustrating an outline of configuration of a computer system according to Embodiment 1. The present computer system includes a host 100, a management server 110, and a storage system 120. The number of hosts, management servers and storage systems capable of being included in the computer system can be an arbitrary number of one or greater.

A host is a computer performing operations and the like using data stored in the storage system. The host and the storage system are coupled via a data network 130, and are capable of communicating mutually. The data network is also called a SAN (Storage Area Network), which is configured using general techniques such as FC (Fibre Channel) and the Ethernet.

A management server is a computer for managing the storage system, such as setting of various functions provided by the storage system. The management server and the storage system are connected via a management network 131, and are capable of communicating mutually. The management network is also configured using general techniques such as the Ethernet.

A storage system is configured of one or more media 150 for storing data read or written by the host, and one or more storage controllers 140 performing data transfer control and the like among the host and media. General techniques related, for example, to SSDs (Solid State Drives) 151 and HDDs (Hard Disk Drives) 152 can be used for the media.

The storage controller is configured of devices such as a processor 141, a memory 142, a host interface 160 (sometimes simply referred to as port), a management interface 161, and a media interface 162. An arbitrary number of one or greater of respective devices can be included in the storage controller.

Each device in the storage controller is mutually connected via an internal network, and is capable of communicating. Similarly, each storage controller in the storage system is also mutually connected via an internal network, and is capable of communicating.

The processor can execute programs for realizing various functions of the storage controller, such as a program for processing commands received from a host. However, at least a part of the functions of the storage controller can be executed by devices other than the processor (such as a dedicated hardware).

A host interface and a management interface are devices respectively connected to a host and a management server and communicating therewith. Communication protocols used in a data network and a management network are respectively implemented in the host interface and the management interface, which enable data and commands to be communicated between the host and the management server.

A media interface is a device connected to media and performing mutual communication therewith. Standard communication protocols such as FC, Serial Attached SCSI (SAS), Serial Advanced Technology Attachment (SATA) and the like are implemented in the media interface, enabling communication of data and commands.

Hereafter, the respective devices such as the processors, the memories, the media and the host interfaces included in the storage controller used for processing I/O requests from the host are referred to as "physical resources". Further, the types of devices such as processors and memories are called "resource classifications". The storage controller according to the present embodiment uses so-called virtual machine technology to logically divide one physical resource (or the processing capacity thereof) to generate a plurality of virtual resources (such as virtual processors and virtual ports). Specifically, for example, by allocating the processing capacity of a physical resource to multiple virtual resources in a time-sharing manner, one physical resource is logically divided. A maximum processing capacity is determined in each physical resource. In the present specification, the maximum processing capacity of each physical resource is called "marginal resource amount". These resources are consumed by executing processes such as I/O processing. The present specification allows a configuration where the marginal resource amounts differ within the same resource classification.

Figure 2:
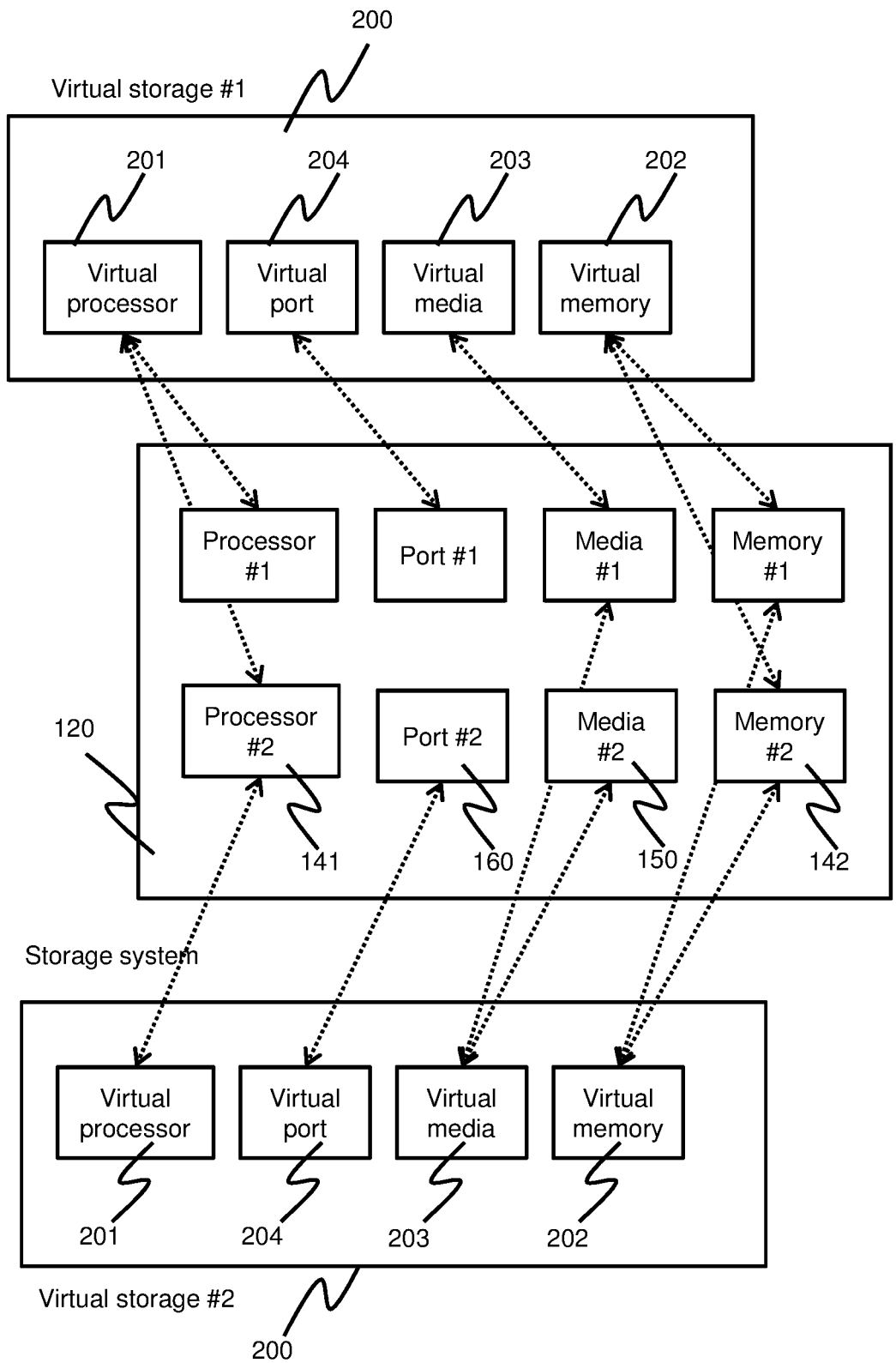
FIG. 2 is a configuration diagram of a virtual storage according to the present invention.

FIG. 2 is a view showing a configuration example of a virtual storage. A virtual storage 200 is a logical storage having virtual resources (a virtual processor 201, a virtual memory 201, a virtual media 203, and a virtual port 204) having virtualized the physical resources (the processor 141, the memory 142, the media 150, and the port 160) of the storage system 120. The storage system can configure a plurality of virtual storages. The virtual resources respectively correspond to the processor, the memory, the media and the port included in the storage system.

Figure 3:
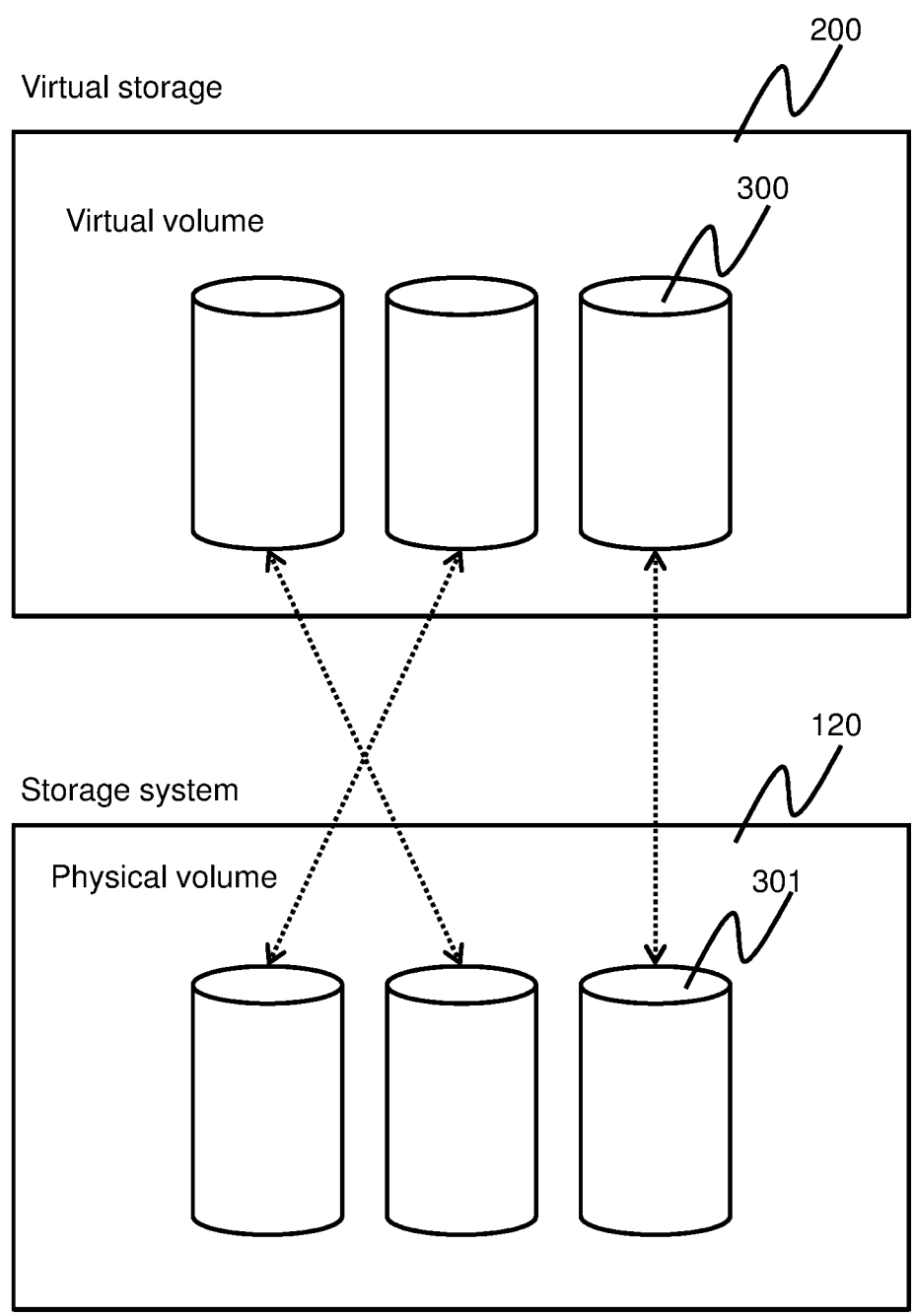
FIG. 3 is a configuration diagram of a virtual volume according to Embodiment 1.

FIG. 3 is a view illustrating a configuration example of a virtual volume according to Embodiment 1. A virtual volume 300 is a virtual logical volume provided by the virtual storage 200, which is configured of physical volumes 301. The virtual volume is created by a resource allocation program 400. A physical volume is a logical volume directly mapped to the media 150.

In the present embodiment, for convenience, we will illustrate a configuration where the virtual volumes and physical volumes are in a one-to-one corresponding relationship, and the volume sizes are the same. However, it is also possible to create one virtual volume by combining two physical volumes having half the volume size, or to map one physical volume to a plurality of virtual volumes.

Figure 4:
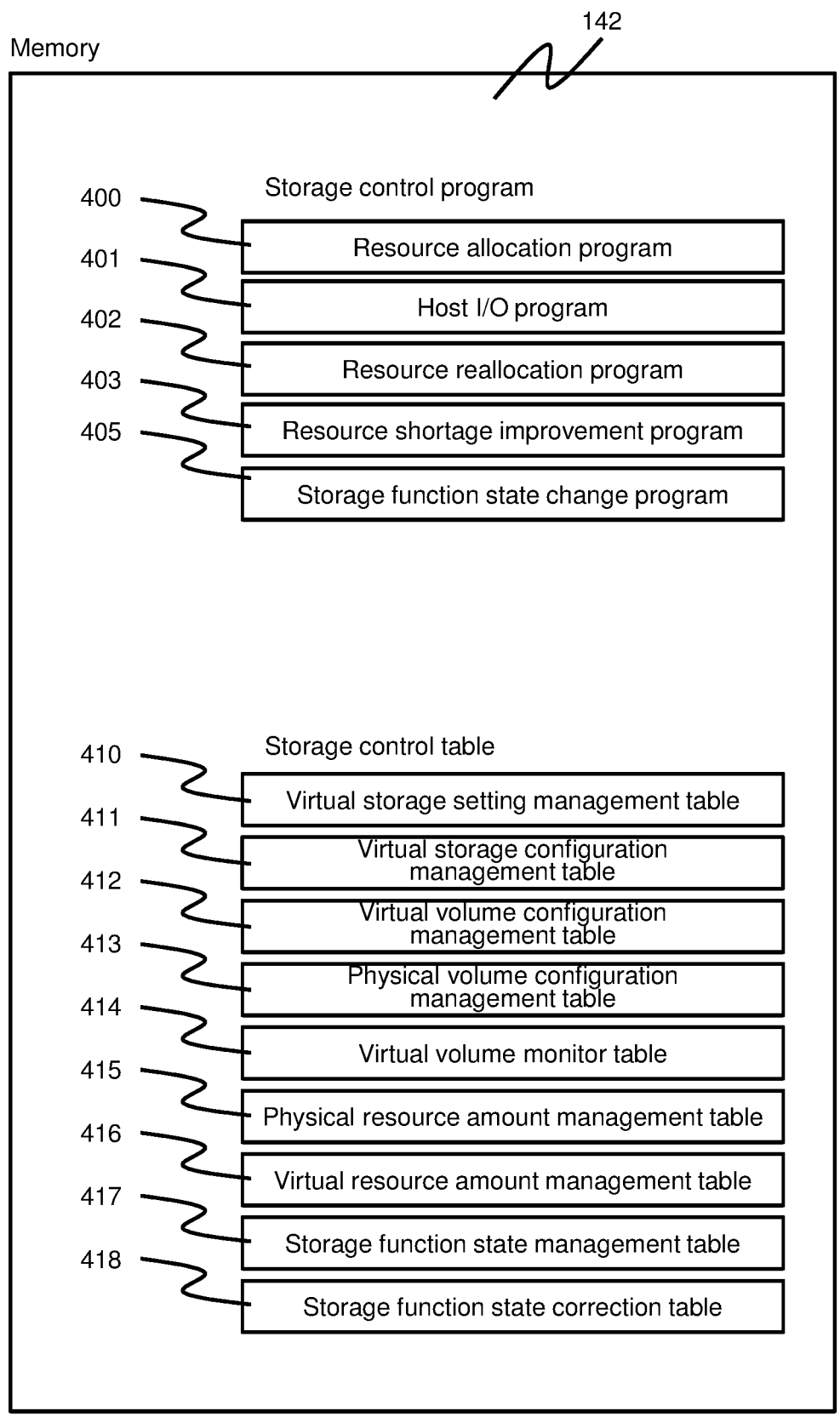
FIG. 4 is a view illustrating an example of control programs and an example of control tables according to the present invention.

FIG. 4 is a block diagram illustrating one example of a storage control program and a storage control table stored in the memory 142. The storage control program includes, at least, a resource allocation program 400, a host I/O program 401, a resource reallocation program 402, a resource shortage improvement program 403, a shared resource freeing program 404, and a storage function state change program 405. The details of each program will be described later.

The storage control table includes, at least, a virtual storage setting management table 410, a virtual storage configuration management table 411, a virtual volume configuration management table 412, a physical volume configuration management table 413, a virtual volume monitor table 414, a physical resource amount management table 415, a virtual resource amount management table 416, a storage function state management table 417, and a storage function state correction table 418. The details of each control table will be described later.

The storage control program illustrated in FIG. 4 refers to the stage control table also illustrated in FIG. 4 to control the operation of the storage system 120. In the above description, the various management information are referred to as "tables", but the data structures of the management information are not restricted to tables. The management information is not dependent on the data structure, and can be represented via an appropriate data structure, such as lists and queues.

FIG. 5 illustrates one example of the virtual storage setting management table 410. A virtual storage setting management table is a table for managing the configuration information of the virtual storage 200 designated by the management server 110, and a plurality of tables can exist for each storage system 120. The virtual storage setting management table includes, at least, a virtual storage number (hereinafter also abbreviated as VS #) column 501, a virtual volume number (hereinafter also abbreviated as VVOL #) column 502, a target resource utilization rate column 504, and a priority order column 505.

The virtual storage number column 501 stores the identifier of the virtual storage provided by the storage system. The virtual volume number column 502 stores the identifier of the virtual volume 300 belonging to the relevant virtual storage. Multiple virtual volume numbers can be stored in the present column.

The resource utilization rate being the target of the relevant virtual storage is stored in the target resource utilization rate column 504. The target resource utilization rate is a value used by the resource reallocation program 402, which is a value set to control a spare quantity of the virtual resource amount required to achieve the target performance.

For example, when the target resource utilization rate 504 is set to 10%, it is possible to have the virtual storage occupy ten times the amount of the virtual resource that the storage system 120 has estimated as necessary to achieve the target performance, enabling to reduce the risk of unattained target performance caused by the change of workload compared to when it is set to 90%. The target resource utilization rate 504 can be designated by the management server, but in the present embodiment, an example is illustrated where the storage system 120 performs automatic adjustment. The definition of the virtual resource amount according to the present embodiment will be described later.

A value representing the order of priority among virtual storages related to the level of performance guarantee is stored in the priority order column 505. The priority order 505 is a value used by the resource shortage improvement program 403, meaning that the priority order is higher as the value of the priority order 505 approximates 1. The virtual storages having higher priority order 505 are set with higher priority as the processing target of the resource shortage improvement program 403. By having the resource shortage improvement program 403 executed, the risk of unattained target performance caused by the change of the concerned resource can be reduced.

FIG. 6 illustrates one example of the virtual storage configuration management table 411. A virtual storage configuration management table is a table showing the configuration information of the respective virtual resources configuring the respective virtual storages 200, and at least includes a VS # column 601, a virtual port configuration column 602, a virtual processor configuration column 603, a virtual memory configuration 604, and a virtual media configuration column 605.

The virtual port configuration column 602 shows a virtual resource amount of the virtual port 204 configured of a plurality of ports 160. The virtual resource amount of the virtual port 204 is represented, for example, by a port performance (Gbps) and the number of ports (number). The virtual processor configuration column 603 illustrates the virtual resource amount of the virtual processor 201 configured of a plurality of processors 141. The virtual resource amount of the virtual processor 201 is represented, for example, by a processor performance (GHz) and the number of processors (number).

The virtual memory configuration column 604 illustrates a virtual resource amount of the virtual memory 202 configured of a plurality of memories 142. The virtual resource amount of the virtual memory 202 is represented, for example, by a memory amount (Byte). The virtual media configuration column 605 illustrates a virtual resource amount of the virtual media 203 configured of a plurality of media 150. The virtual resource amount of the virtual media 203 is represented, for example, by a media classification (such as SSD 151 or HDD 152) and the number of media (number). It is assumed that an amount of resource per media (media classification resource amount) is determined, in advance in the system, uniquely in each media classification, such as 100 IOPS of HDDs and 10000 IOPS of SSDs. Of course, it is possible to add a media classification having a different media classification resource amount.

The values of columns 602 to 605 will hereinafter be referred to as total amount of virtual resources. For example, the total amount of virtual port resources (virtual port configuration 602) of VS # 001 is 8 Gbps, the total amount of virtual processor resources (virtual processor configuration 603) is 2.3 GHz, the total amount of resources of the virtual memory (virtual memory configuration 604) is 200 GB, and the total amount of resources of the virtual media (virtual media configuration 605) is 30000 IOPS. On the other hand, a portion (such as few tens of %) of a specific single physical resource allocated to the virtual storage is called a virtual resource amount. For example, if 10% of a physical processor having a 2 GHz performance (in other words, 0.2 GHz) is allocated to a certain virtual storage, this state is referred to as the virtual resource amount of the processor being allocated to a virtual storage is 0.2 GHz.

The method for designating the respective total amount of virtual resources stored in the virtual storage configuration management table 411 is merely an example, and a general unit showing the amount of resources related to processing performances can be used. Further, as one column of the virtual storage configuration management table 411, it is also possible to define the total amount of virtual resources of the virtual resource configured of other resource classifications included in the storage system 120.

FIG. 7 illustrates an example of the virtual volume configuration management table 412. The virtual volume configuration management table 412 is information showing the corresponding relationship between the respective virtual volumes 300 and the physical volumes 301. The virtual volume configuration management table 412 includes at least a VVOL # column 701, a volume size column 702, a physical volume number column 703, and a target performance column 704. Especially when "N/A" is stored in the physical volume number column 703, it means that the relevant virtual volume is not used.

A target performance of the virtual volume is stored in the target performance column 704. As the target performance, a throughput performance (such as IOPS), a response performance (such as milliseconds), or a combination thereof can be designated. The throughput and the response can be designated by ranges. In other words, it can be designated by values such as "100 IOPS or greater", "200 IOPS or smaller", or a combination thereof. However, in the present embodiment, for convenience, only the lower limit value of the throughput performance and the upper limit value of the response performance can be designated. FIG. 7 illustrates an example where the lower limit value of the throughput performance is designated.

Especially, when a throughput performance is set as target performance, it is applied to all virtual volumes belonging to the relevant virtual storage. For example, when 100 IOPS is set as the target performance, it shows that the total value of the relevant virtual volumes is 100 IOPS. The method for managing the performance of a case where a response performance is set as the target performance will be illustrated as a third embodiment. The unit of target performance is not restricted to the above unit, and can be any unit as long as the throughput performance or the response performance can be designated.

FIG. 8 illustrates one example of the physical volume configuration management table 413. The physical volume configuration management table 413 is a table retaining information of physical resource in charge of processing the relevant physical volume (hereinafter referred to as concerned resource) for each physical volume 301 included in the storage system 120. The physical volume configuration management table 413 includes, at least, a physical volume number column 801, a volume size column 802, a concerned port number column 803, a concerned processor number column 804, a concerned memory number column 805, and a concerned media number column 806.

The identifiers of the respective concerned resources of the physical volume are stored in columns 803 through 806. Specifically, a unique identifier, such as "HDD100", "SSD100" and so on, is shown for each media classification as the concerned media number, but any identifier can be used as long as the storage destination media can be specified. Further, when "N/A" is stored in the volume size column 802, it shows that the relevant physical volume number is not defined.

Incidentally, in the actual process for storing data to the memory 142 or the media 150, a process for calculating the storage destination memory address and media address is required, but since these are general processes, it will not be described in the present specification. Further, RAID (Redundant Arrays of Inexpensive Disks) technique can be applied to the respective physical volumes. In that case, the physical volume data is stored in a dispersed manner in multiple media 150, so that a plurality of media identifiers are stored in the concerned media number 806.

FIG. 9 shows one example of the virtual volume monitor table 414. The virtual volume monitor table 414 is a table for storing the monitoring information of each virtual volume 300, and includes at least a VVOL # column 901, a throughput performance column 902, and a response performance column 903. The detailed descriptions of the respective columns are omitted, since they are self-explanatory.

The values of columns 902 and 903 are updated by the host I/O program 401. In the present specification, the details of the method for updating these values are not described, but update using a common monitoring technique is possible. For example, the update of throughput performance can be realized via a process for successively counting the number of I/Os received by the host and totalizing the number every second.

Figure 10:
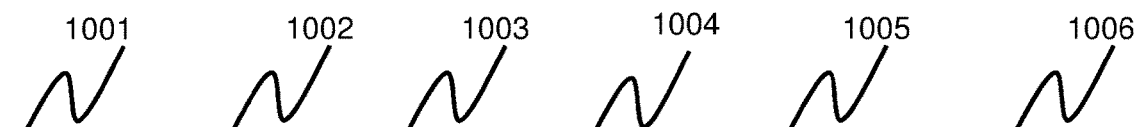
FIG. 10 is a configuration diagram of a physical resource amount management table according to Embodiment 1.

FIG. 10 shows one example of the physical resource amount management table 415. The physical resource amount management table 415 is a table for managing the amount of respective physical resources provided in the storage system 120. The physical resource amount management table 415 includes, at least, a resource classification column 1001, a resource number column 1002, a marginal resource amount column 1003, a resource allocation rate column 1004, a physical resource utilization rate column 1005, and a utilization rate threshold column 1006.

The resource classification column 1001 stores resource classifications such as the port 160, the processor 140, the memory 142 and the media 150, showing information for uniquely specifying the respective physical resources within the storage system 120 together with the identifier of each resource classification stored in the resource number column 1002. The marginal resource amount column 1003 stores values representing the processing capacities of the respective physical resources.

The resource allocation rate column 1004 shows a rate of the total resource amount that all the virtual storages 200 using the relevant physical resource occupies among a marginal resource amount 1003 of the relevant physical resource. Similarly, the physical resource utilization rate column 1005 shows a rate of the total resource amount that all the virtual storages using the relevant physical resource uses to execute the I/O processing among the marginal resource amount 1003 of the relevant physical resource. As described earlier, the resource allocation rate 1004 and the physical resource utilization rate 1005 of the relevant table are values based on the processing performance of the physical resources. In the present specification, for convenience, "100%−(resource allocation rate 1004)" is also referred to as an excessive resource rate.

For example, in the example of a port where a marginal resource amount 1003 is 4 Gbps, "10% resource allocation rate" shows that 400 Mbps is occupied by (allocated to) the virtual storage 200, and "1% physical resource utilization rate" shows that 40 Mbps is used (operated) in the virtual storage 200 to perform the I/O processing. Similarly, in the case of a processor whose marginal resource amount 1003 is 2 GHz, "50% resource allocation rate" shows that 1 GHz (or 500 ms per second) is occupied by the virtual storage 200, and "40% physical resource utilization rate" shows that 0.8 GHz (or 400 ms per second) is used (operated) in the virtual storage 200 to perform I/O processing.

In a case where the marginal resource amount 1003 is a 4-GB memory, "50% resource allocation rate" shows that 2 GB is occupied by the virtual storage 200, and "40% physical resource utilization rate" shows that the capacity of cache referred to as read cache per unit time by the virtual storage 200 is 1.6 GB. Similarly, in a case of media whose marginal resource amount 1003 is 100 IOPS, "50% resource allocation rate" shows that 50 IOPS is occupied by the virtual storage 200, and "10% physical resource utilization rate" shows that 10 IOPS is used in the I/O processing of the virtual storage 200.

Examples for calculating the resource allocation rate 1004 and the physical resource utilization rate 1005 of the respective resources have been illustrated above. Of course, the values can be calculated by different calculation expressions, and different units can be used, as long as the values represent the resource amount targeting the processing performance of the respective physical resources.

The utilization rate threshold column 1006 shows a threshold value for determining a resource shortage state of the relevant physical resource. For example, if the utilization rate threshold is 80%, the relevant physical resource is determined to be in a resource shortage state when the physical resource utilization rate 1005 exceeds 80%. The physical resource in a resource shortage state may be a hindrance to the virtual storage 200 trying to achieve the target performance, so that it is improved by the resource shortage improvement program 403.

Figure 11:
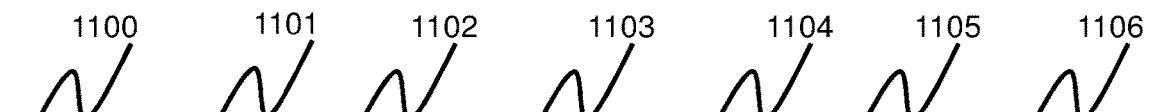
FIG. 11 is a configuration diagram of a virtual resource amount management table according to Embodiment 1.

FIG. 11 shows one example of the virtual resource amount management table 416. The virtual resource amount management table 416 is a table for managing the virtual resource amount of each resource allocated to the virtual storage 200. The virtual resource amount management table 416 includes, at least, a VS # column 1100, a VVOL # column 1101, a resource classification column 1102, a resource number column 1103, a resource occupancy column 1104, a shared resource occupancy column 1105, and a virtual resource utilization rate column 1106.

Columns 1100 through 1103 are self-explanatory, so they will not be described. The resource occupancy column 1104 shows the configuration of the respective virtual resources allocated to the virtual volumes within the virtual storage. As an example, it is shown that the virtual resource (virtual processor) allocated to VVOL # 000 in VS # 000 is configured to occupy 50% of the marginal resource amount 1003 of processor 000.

An excessive resource amount that the virtual storage has is stored in a shared resource occupancy 1105. The details of the shared resources will be described later. A resource utilization rate of the relevant virtual volume with respect to the virtual resource amount (marginal resource amount 1003×resource occupancy 1104) allocated to the virtual volume within the virtual storage is stored in the virtual resource utilization rate column 1106. For example, we will assume a case where VVOL # 000 in VS # 000 occupies 0.4 Gbps of the resource of port 000, which is 10% the resource amount of port 000 whose marginal resource amount 1003 is 4 Gbps, and utilizes 0.28 Gbps thereof. In this case, a virtual resource utilization rate 1106 is calculated as 70% (=0.28÷0.4).

Figure 12:
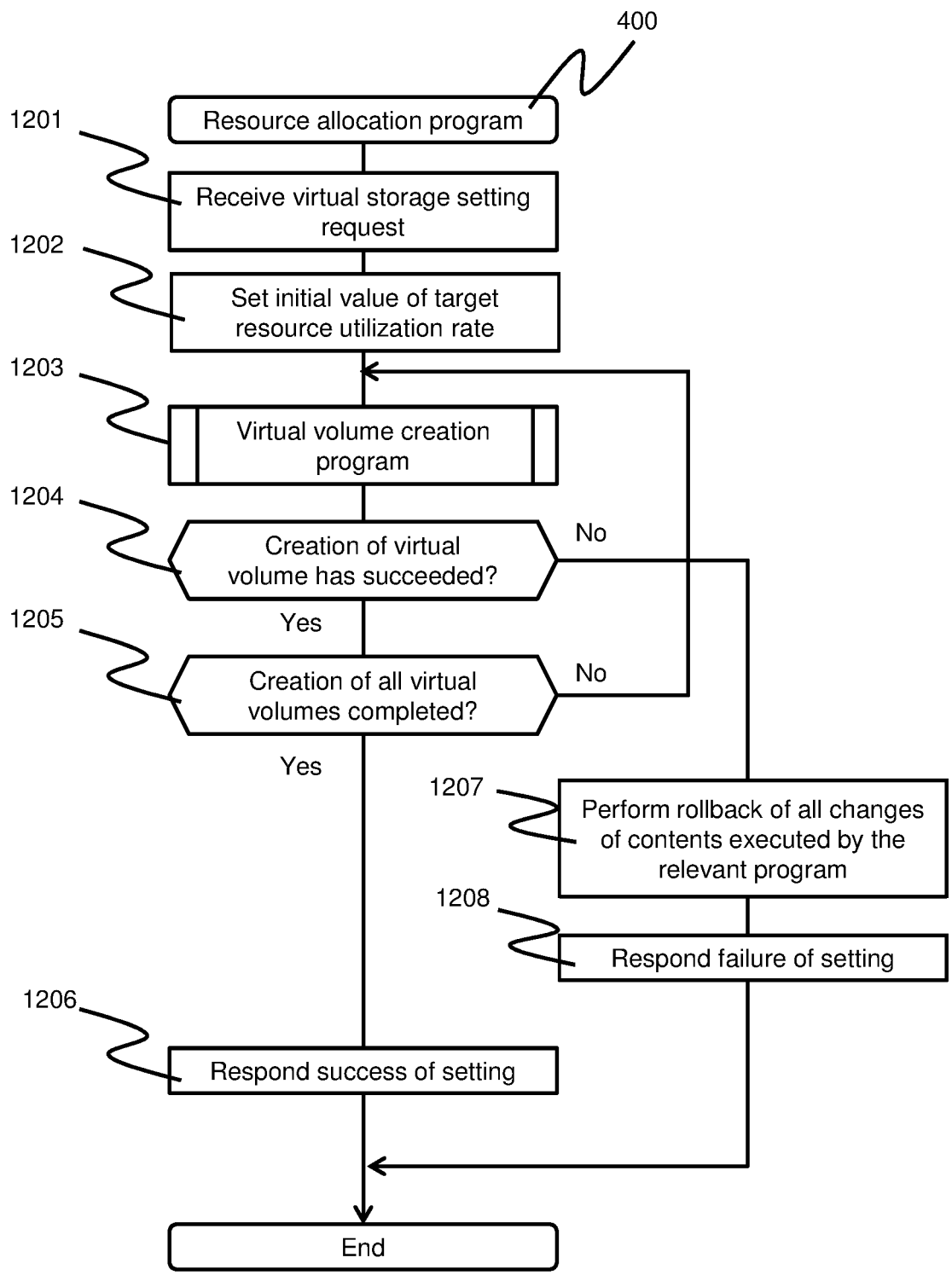
FIG. 12 is a configuration diagram of a resource allocation program according to Embodiment 1.

FIG. 12 shows one example of the resource allocation program 400. The resource allocation program 400 is a program executed according to a virtual storage setting request from the management server 110, which is executed by one of the plurality of processors 141. Further, the resource allocation program 400 is a program for setting the total amount of virtual resources (columns 602-605) of the virtual storage 200, and for determining which physical resource among the physical resources in the storage system 120 should be allocated to the virtual storage 200 and how much resource should be allocated as for the physical resource being allocated.

At first, the relevant program receives a virtual storage setting request (1201). The setting request includes the virtual storage number of the setting target virtual storage 200, the virtual volume number, the virtual volume size, the virtual volume target performance, and various values to be stored in a virtual storage setting table 410 or a virtual storage configuration table 411. Next, a virtual volume creation program is executed (1203), based on which creation of respective virtual volumes belonging to the relevant virtual storage and allocation of virtual resource amount are started. The details of the virtual volume creation program will be described later.

The relevant program executes the virtual volume creation program to all virtual volumes belonging to the relevant virtual storage (1205), responds that setting has succeeded to the management server, and ends the process (1206). If virtual volume creation fails (1204: No), the program performs rollback of all the changes of contents executed by the relevant program (1207), responds that setting has failed to the management server 110, and ends the process (1208).

In step 1202 of the relevant program, an initial value of the target resource utilization rate 504 is set. The initial value of the target resource utilization rate 504 is optional, but it should be set to a low value (such as 20%, for example). The reason for this is because the relevant target resource utilization rate 504 is raised in a stepwise manner by the resource reallocation program 402 considering the virtual resource utilization rate 1106 and finally fixed at a point of time when a minimum necessary virtual resource amount has been allocated.

Figure 13:
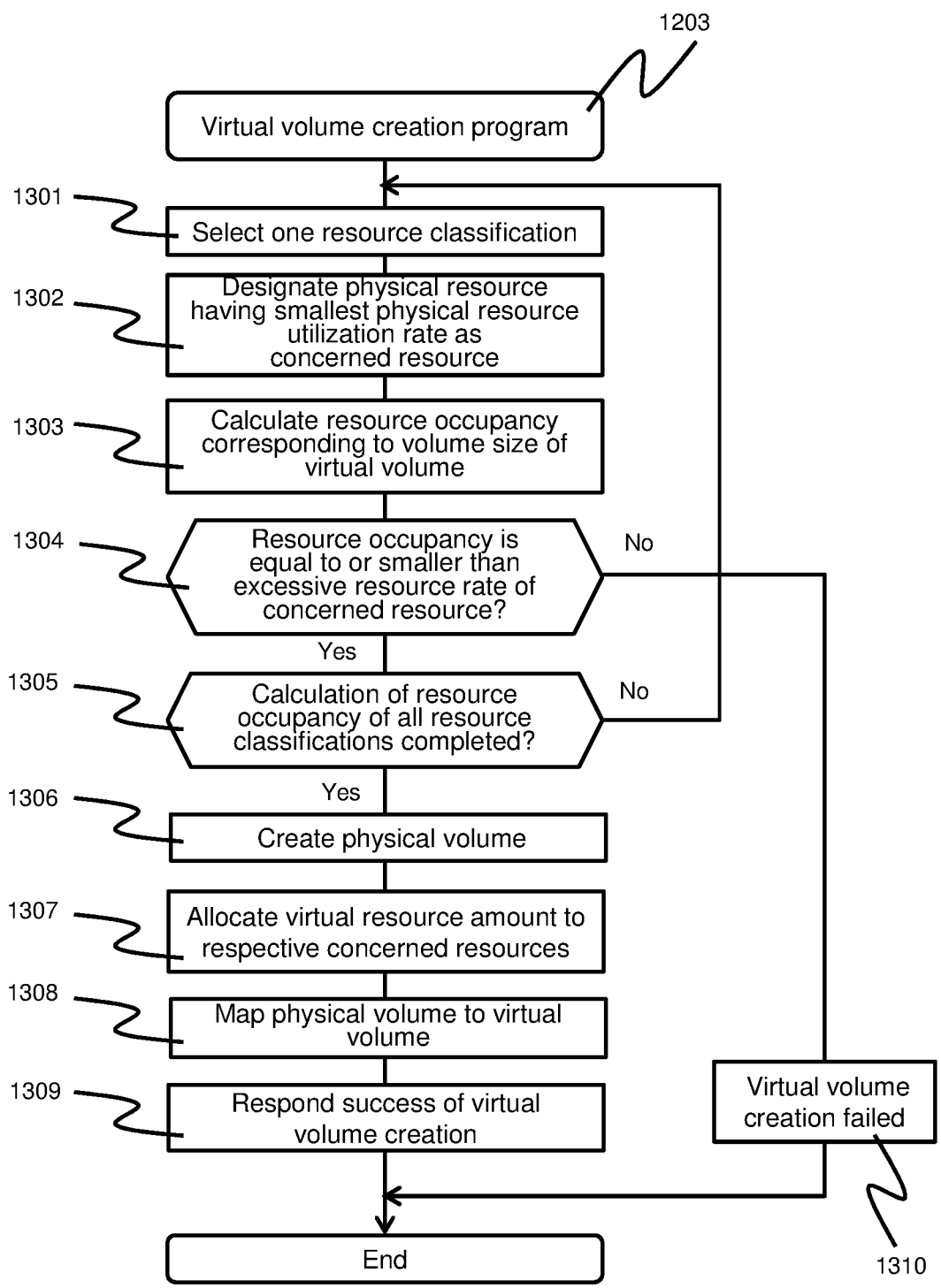
FIG. 13 is a configuration diagram of a virtual volume creation program according to Embodiment 1.

FIG. 13 is one example of a virtual volume creation program 1203. In the virtual volume creation program, a virtual volume is created, and a virtual resource amount corresponding to the relevant virtual volume is allocated. At first, the relevant program selects one resource classification (1301), and executes the processes of steps 1302 through 1304 to the selected resource classification. Hereafter, the processes of steps 1302 through 1304 are described, assuming that the processor has been selected as the resource classification.

The virtual volume creation program 1203 selects, among all the physical processors 141 being the selected resource classification, a physical processor 141 having the smallest physical resource utilization rate 1005 as the concerned resource (1302). In the example of FIG. 10, "processor 001" is selected.

Next, the virtual volume creation program 1203 calculates the resource occupancy 1104 corresponding to the virtual volume (1303). One example of a method for calculating the resource occupancy 1104 of a certain virtual volume is to calculate "(total amount of virtual resources of processor (in other words, value of virtual processor configuration 603)) ÷(total sum of volume sizes of virtual volumes belonging to relevant virtual storage)×(volume size of relevant virtual volume)÷(marginal resource amount of concerned processor)". Here, the marginal resource amount of the concerned processor is the marginal resource amount 1003 of the physical processor 141 selected in step 1302.

Now, the objective of step 1303 is to determine appropriate resource occupancy as the initial value of the resource occupancy for the relevant virtual volume. The resource occupancy can be calculated by different ways as long as it is in accordance with the relevant objective. For example, the value can be calculated simply by "total amount of virtual resources designated by management server)÷(total number of virtual volumes belonging to relevant virtual storage)÷(marginal resource amount of concerned resource)".

If the determined resource occupancy is greater than the excessive resource rate of the concerned processor (1304), the virtual volume creation program 1203 responds failure of virtual volume creation, and ends the process (1310). The processes of steps 1301 through step 1304 are repeated for all resource classifications (1305).

After determining the resource occupancy corresponding to the relevant virtual volume for each resource classification, the virtual volume creation program 1203 creates a physical volume (1306), and maps the determined concerned resource to the relevant physical volume. Specifically, regarding the physical volume configuration management table 413, the virtual volume creation program 1203 selects a physical volume number whose physical volume is not defined, and after storing the volume size of the virtual volume to the volume size 802, it stores the determined identifier of the concerned resources to columns 803 through 806 for each resource classification.

Next, with respect to resource allocation rate 1004 and resource occupancy 1104 of the respective concerned resources being mapped, the virtual volume creation program 1203 adds the resource occupancy determined in step 1303, and allocates the virtual resource amount (1307). Lastly, the virtual volume creation program 1203 maps the physical volume to the virtual volume (1308). Specifically, it stores the VVOL # of the created virtual volume to VVOL # 701 of the virtual volume configuration management table 412. Then, the physical volume number of the physical volume created in step 1306 is stored in the physical volume number 703, and the physical volume number of the physical volume created in step 1306 is stored in the volume size 702 of this row. Lastly, it responds success of virtual volume creation (1309), and ends the process.

According to the relevant program, it becomes possible to determine the concerned resources of the respective virtual volumes belonging to the relevant virtual storage in response to the virtual storage setting request from the management server, and to allocate the appropriate virtual resource amount to the respective concerned resources.

Figure 14:
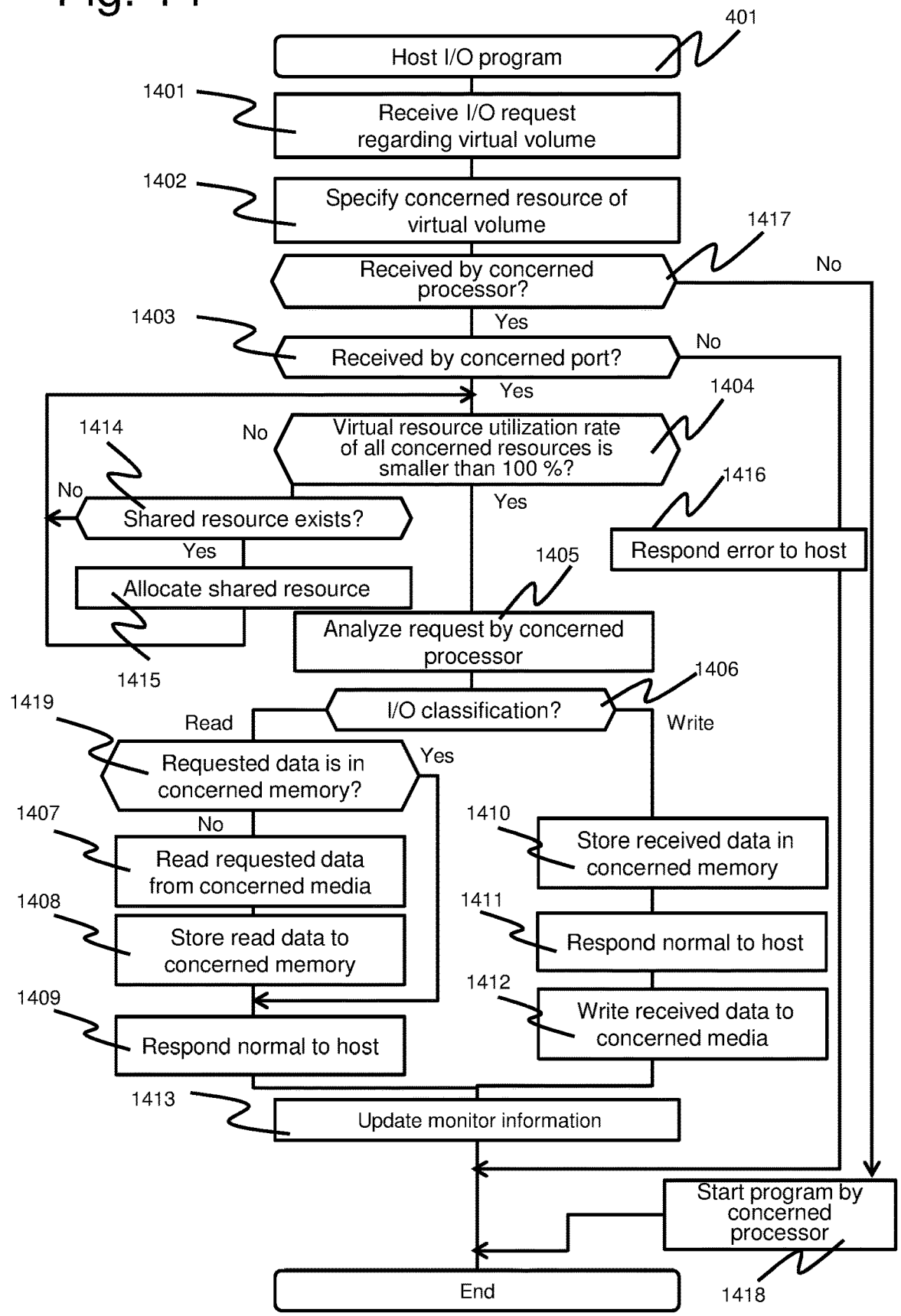
FIG. 14 is a configuration diagram of a host I/O program according to Embodiment 1.

FIG. 14 illustrates one example of the host I/O program 401. The host I/O program is a program for processing a Read/Write command regarding a virtual volume 200 issued by the host 100 and received by the storage system 120. When a command is received, the execution of the host I/O program 401 is started in response to the relevant command in one physical processor 141 arbitrarily selected by the storage system 120.

When an I/O request regarding a virtual volume is received (1401), the storage system 120 specifies the concerned resources of the relevant virtual volume by using the virtual volume configuration management table 412 and the physical volume configuration management table 413 (1402). Next, the host I/O program 401 judges whether its own processor is the concerned processor or not (1417). If it is not the concerned processor, the host I/O program 401 corresponding to the relevant command is caused to be started in the concerned processor (1418), and the processing in the own processor is ended.

If it is the concerned processor, the host I/O program 401 checks whether the request is for the concerned port of the relevant virtual volume (1403). If the request is not for the concerned port, it responds an error to the host (1416), and ends the process.

If the request is for the concerned port, the host I/O program 401 checks whether the virtual resource utilization rates 1106 of all the concerned resources are smaller than 100% by using the virtual resource amount management table 416 (1404). If any one of the virtual resource utilization rates 1106 of the concerned resources is 100%, then it is determined that the virtual resource amount for processing the relevant virtual volume is insufficient, and the process stands by until the virtual resource utilization rates of all concerned resources become smaller than 100%.

The storage system 120 illustrated in the present embodiment has a function to temporarily allocate shared resources in order to eliminate the risk of unattained target performance caused by standing-by. Shared resources are the amount of resources of the respective physical resources that are not allocated to any of the virtual storages. Since the shared resource is not always allocatable, the risk of unattained target performance cannot be completely eliminated, and in this point, the present function differs from the allocation of the virtual resource amount performed by the virtual volume creation program.

The relevant program judges whether a shared resource exists or not regarding the concerned resource of the resource classification whose virtual resource utilization rate 1106 is 100%, based on whether the resource occupancy 1104 is smaller than 100% or not (1414). If a shared resource exists, the shared resource is allocated to the relevant virtual storage (1415). In the present embodiment, the resource amount of the shared resource being allocated is a predetermined fixed amount.

The allocation of shared resources is, specifically, adding a fixed ratio (ratio corresponding to the aforementioned fixed amount) to the physical resource utilization rate 1005 and the shared resource occupancy 1105 of the concerned resource, and then recalculating the virtual resource utilization rate 1106. When adding a value to the shared resource occupancy 1105, if the identifiers of the I/O target virtual storage and virtual volume are 000 and 000, respectively, the value in the shared resource occupancy 1105 of the row where the VS # 1101 is "000" and the VVOL # 1101 is "000" in the virtual resource amount management table 416 is updated. By allocating shared resources, all the virtual resource utilization rates become smaller than 100%, so that the processes of steps 1405 and thereafter becomes executable without standing by.

If all of the virtual resource utilization rates are smaller than 100% (1404: Yes), the relevant program analyzes the request of the command by the concerned processor (1405), and checks the request classification (read or write) (1406). If it is a read request, whether the requested data is stored in the concerned memory or not is judged (1419). If it is stored, the data stored in the concerned memory is returned to the host, and a response notifying that the processing has been completed normally is sent to the host (1409). If it is not stored, the requested data is read from the concerned media (1407), stored in the concerned memory (1408), and thereafter, the data in the concerned memory is sent to the host and a response notifying that the processing has been completed normally is sent to the host (1409).

On the other hand, if it is a write request, after the received data is stored in the concerned memory (1410), a normal response is returned to the host (1411), and the requested data is written to the concerned media (1412). Lastly, the monitoring information is updated (1413) and the process is ended.

The monitoring information updated in this step is, specifically, the throughput performance 902 and the response performance 903 of the relevant virtual volume, the physical resource utilization rate 1005 of the concerned resource used by the relevant program, and the virtual resource utilization rate 1106. As for the virtual resource utilization rate 1106, the value of the virtual storage to which the relevant virtual volume belongs is updated. Incidentally, the method for updating the respective monitoring information has already been described in the respective tables having respective columns.

FIG. 15 is a view illustrating the outline of processing of the resource reallocation program 402. The resource reallocation program performs resource reallocation with two aims. One of the aims of the resource reallocation program is to eliminate the risk of the target performance being unattained by the virtual resource utilization rate of one of the physical resources becoming 100%, by changing the resource occupancy 1104 to level the virtual resource utilization rate 1106 of the respective concerned resources of the virtual storage 200.

The other aim of the resource reallocation program is to set the virtual resource amount for achieving the target performance to the minimum necessary value, by performing control to gradually raise the target resource utilization rate 504 considering the virtual resource utilization rate.

In the example of FIG. 15, the virtual storage has two virtual volumes 200 (#1 and #2). Further, target throughput performances 704 of the respective virtual volumes are 100 IOPS and 300 IOPS, respectively, and concerned processors 804 are (physical) processors #1 and #2, respectively. Here, we will describe an example where the performances of the respective virtual volumes have achieved the target throughput performance 704.

Now, we will assume that the virtual resource utilization rates of the processors allocated to the respective virtual volumes are 40% and 60%, respectively. In this state, since the processing loads among the concerned resources are biased, there is a risk of the target performance being unattained by the virtual resource utilization rate of only the processor #2 being 100% when the load is increased. Therefore, the relevant program changes the resource occupancy of processor #1 to 40% and the resource occupancy of processor #2 to 60% so that the virtual resource utilization rates of the respective concerned resources are equalized (for example, so that both virtual resource utilization rates become 50%) (1501). The details of this process will be described when describing the process of FIG. 16, and in the present process, adjustment is performed so that the amounts of use of virtual resources of the resources (such as the processors) allocated to the respective virtual volumes do not change. Therefore, the resource occupancy is reduced when the virtual resource utilization rate is increased, and the resource occupancy is increased when the virtual resource utilization rate is reduced.

If the virtual resource utilization rate is 50%, there will still be spare resources even when the utilization rate is increased. Therefore, the storage system 120 raises the target resource utilization rate 504 of the virtual processor (virtual storage) from 50% to 60% (1502), and reduces the estimated virtual resource amount required to achieve the target performance. In other words, by changing the resource occupancy of processor #1 to 33% and the resource occupancy of processor #2 to 50%, the virtual resource utilization rate of the virtual processor is controlled to be 60% (1503). The details of this process will be described when illustrating the process of FIG. 16. This process is repeatedly performed, and finally at the point of time when shared resources are allocated to the relevant virtual storage, it is determined that the value cannot be increased any further (that the virtual resource amount has been set to the minimum necessary value), and the target resource utilization rate is determined.

Figure 16:
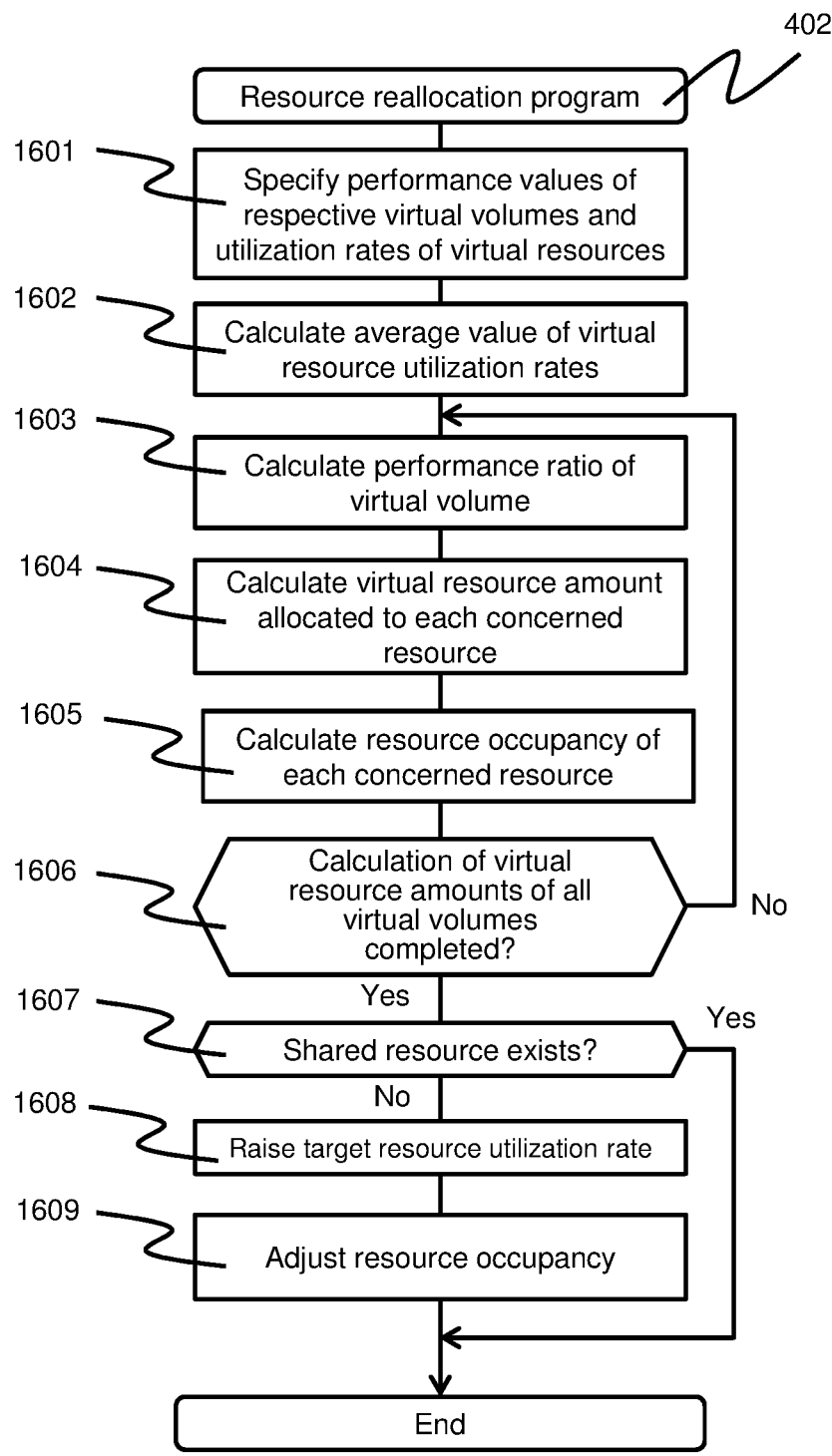
FIG. 16 is a configuration diagram of the resource reallocation program according to Embodiment 1.

FIG. 16 illustrates one example of the resource reallocation program 402. The resource reallocation program 402 is executed for each of the virtual storages 200.

At first, for each virtual volume 300 belonging to the virtual storage 200, the resource reallocation program 402 specifies the performance value of each virtual volume and the virtual resource utilization rates 1106 of the concerned resources of each virtual volume by using the values in the virtual volume monitor table 414 and the virtual resource amount management table 416 (1601). Next, the resource reallocation program 402 calculates, for each resource classification, an average value of the virtual resource utilization rates 1106 of the concerned resources of each of the virtual volumes. This operation will be described, taking FIG. 15 as an example. In FIG. 15, the virtual resource utilization rates of the concerned resources (concerned processors) of virtual volumes #1 and #2, in other words, of processors #1 and #2, are 40% and 60%, respectively. In step 1602, the average value thereof, that is, (40+60)÷2=50%, is calculated.

Next, for each virtual volume, the resource reallocation program 402 calculates the following (1603):

(performance value of virtual volume specified in step 1601÷target performance 704).

In the present specification, this value is called "performance ratio".

Thereafter, the resource reallocation program 402 calculates, for each concerned resource of the relevant virtual volume, the virtual resource amount to be allocated.

The storage system 120 according to the present embodiment has a function to calculate the virtual resource amount required to achieve the target performance 704 based on the virtual resource amount of the virtual volume and the performance ratio at the current point of time. For example, this function can be realized by providing to the resource reallocation program 402 a function having the virtual resource amount and the performance ratio used at the current point of time as input values and the virtual resource amount required to achieve the target performance 704 as output. The virtual resource amount used in the virtual volume at the current point of time can be obtained by calculating the following:

(marginal resource amount 1003 of concerned resource×resource occupancy 1104×virtual resource utilization rate 1106)

The storage system 120 according to the present embodiments prepares this function for each resource classification (processor, port, memory and media). In step 1604, the resource reallocation program 401 uses these functions to calculate the virtual resource amounts to be allocated to each concerned resource. In another embodiment, instead of calculating the performance ratio, it is possible to use a function having the performance value and the target performance 704 of the virtual volume specified in step 1601 and the virtual resource amount used at the current point of time as input values and the virtual resource amount required to achieve the target performance 704 as output.

Thereafter, in step 1605, the resource reallocation program 401 calculates the resource occupancy 1104 of each concerned resource by using the resource amount calculated in step 1604, the average value of the virtual resource utilization rates calculated in step 1602 and the marginal resource amount 1003 of the concerned resource, and sets the same in the virtual resource amount management table 416. The actual example of the method for calculating the resource occupancy 1104 will be described of a case where the resource classification is the processor. We will assume that the virtual resource amount (which is the processor resource amount required to achieve the target performance) of the concerned processor of a certain virtual volume (for example, virtual volume #1) calculated in step 1604 is 0.4 GHz, the average value of the virtual resource utilization rates calculated in step 1602 is 50%, and the marginal resource amount of the concerned processor of virtual volume #1 is 2 GHz.

In that case, it is necessary to allocate a processor resource corresponding to 0.8 GHz to virtual volume #1 (since the virtual resource utilization rate is 50%, it is necessary to allocate a resource amount that is double the resource amount calculated in step 1604). Since the marginal resource amount is 2 GHz, the resource occupancy 1104 of virtual volume #1 is calculated to be 0.8÷2=0.4 (that is, 40%). That is, in step 1605, the resource occupancy 1104 of each concerned resource allocated to the virtual volume can be obtained by calculating the following for each concerned resource:

(virtual resource amount required for the virtual volume to achieve the target performance÷average value of virtual resource utilization rates)÷marginal resource amount 1003 of concerned resource Hereafter, the processes of 1603 to 1606 are executed for all virtual volumes until the calculation of the resource occupancy 1104 for each resource is completed. The above-described process corresponds to 1501 of FIG. 15.

Next, the resource reallocation program 401 judges whether shared resources exist or not by judging whether the shared resource occupancy 1104 of the relevant virtual storage is 0% or not (1607). If shared resources exist (the shared resource occupancy 1104 is not 0%), the resource reallocation program 401 determines that there is a risk of unattained target performance caused by the raise of target resource utilization rate, so that it fixes the target resource utilization rate, and ends the process. On the other hand, if there are no shared resources, it is determined that there is no risk of unattained target performance due to the raise of target resource utilization rate, so that the resource reallocation program 401 raises the target resource utilization rate 504 by a fixed amount (such as 10%) (1608).

Thereafter, the resource reallocation program 401 calculates the resource occupancy 1104 of each concerned resource so that the virtual resource utilization rate 1106 of each concerned resource becomes equal to the value of the target resource utilization rate 504, sets the value in the virtual resource amount management table 416, and ends the process (1609). The method for calculating the resource occupancy 1104 of each concerned resource will be described below based on a specific example.

In step 1605, we have described the method for allocating the resource occupancy of the processor resource allocated to virtual volume #1. Here, the same example is used to describe the present step. At the point of time when step 1605 is completed, the virtual resource occupancy of the processor (concerned processor) allocated to virtual volume #1 is 50% and the resource occupancy 1104 is 40%. Further, the marginal resource amount of the concerned processor is 2 GHz, and the amount of processor resource required in virtual volume #1 is 0.4 GHz. In step 1609, the resource occupancy 1104 is adjusted so that the present resource amount (amount of processor resource required for virtual volume #1 to achieve the target performance) does not vary. Specifically, the resource occupancy 1104 is calculated via an expression similar to step 1605, that is, the following expression:

(virtual resource amount required for virtual volume #1 to achieve target performance÷target resource utilization rate 504)÷marginal resource amount 1003

In the above-described example, the resource occupancy 1104 is calculated as follows:

(0.4 [GHz]÷60%)÷2 [GHz]=33.3 . . . %

The processes corresponding to 1503 of FIG. 15 has been described above.

According to the relevant program, by using the monitoring information to dynamically control the occupied resource amount of each concerned resource using the monitoring information, it becomes possible to eliminate the risk of unattained target performance caused by change of workload. Further, by raising the target resource utilization rate in a stepwise manner while referring to the virtual resource utilization rate, it becomes possible to set the virtual resource amount for achieving the target performance to a minimum necessary value. A part of this program can be executed in the management server 110.

Figure 17:
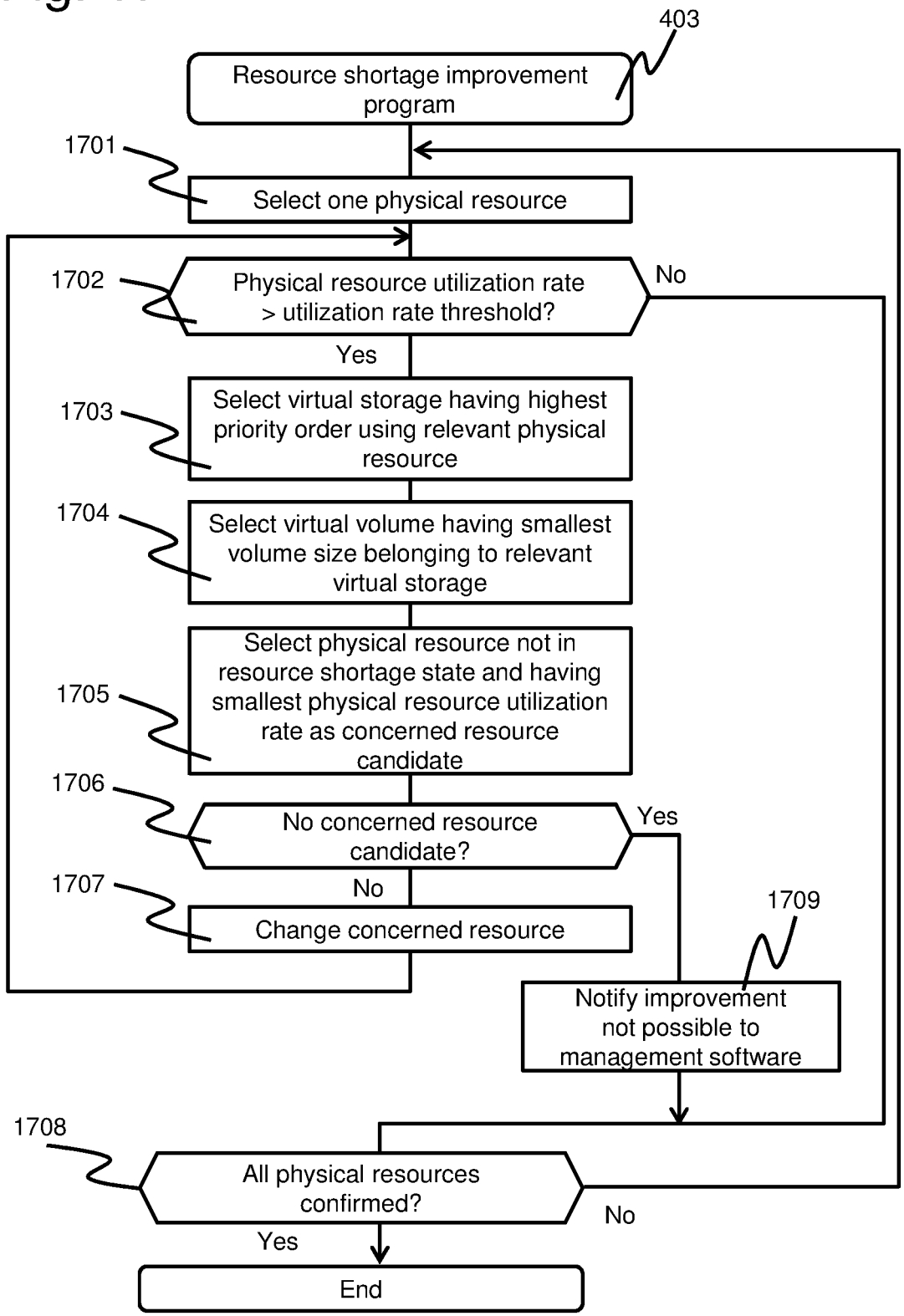
FIG. 17 is a configuration diagram of a resource shortage improvement program according to Embodiment 1.

FIG. 17 shows one example of the resource shortage improvement program 403. The resource shortage improvement program is a program for improving the resource shortage state and eliminating the risk of the target performance being unattained in a virtual storage using the relevant physical resource by detecting that a certain physical resource has changed to a resource shortage state and changing the concerned resource of the virtual storage 200 using the relevant physical resource.

At first, the resource shortage improvement program selects one physical resource belonging to the storage system 120 (1701), and judges whether or not the physical resource utilization rate has exceeded a utilization rate threshold 1006 or not using the physical resource amount management table 415 (1702). If the utilization rate threshold 1006 has been exceeded, it improves the resource shortage state by changing the concerned resources.

Upon improving the resource shortage state, the present program selects the target of change of concerned resources so that the performance of the host 100 is influenced as little as possible. Therefore, the present program selects a virtual storage having the highest priority order 505 among the virtual storages using the relevant physical resource (1703), and selects a virtual volume having the smallest volume size 702 belonging to the relevant virtual storage (1704). Incidentally, the method for selecting the target of change of concerned resources may differ, as long as the aim of reducing the influence on the performance of the host is the same.

Next, the relevant program selects a new concerned resource of the virtual volume selected in step 1704. In the present embodiment, a physical resource that is not in the resource shortage state and having the smallest physical resource utilization rate is selected as the candidate of the new concerned resource (1705). If a new concerned resource candidate exists (step 1705: No), the concerned resource of the virtual volume is changed to the concerned resource selected in step 1705 (1707). Hereafter, the processes from steps 1702 to 1707 are repeatedly performed until the resource shortage state is improved.

The method for changing the concerned resource differs for each resource classification. Hereafter, we will describe the method for changing the concerned resource regarding the resource classifications set as target according to the present specification. For example, the change of the concerned processor can be realized by interrupting the processing of the relevant virtual volume being executed in the migration source physical processor, and resuming the processing in the migration destination physical processor. Similarly, the change of the concerned memory can be realized by purging all the data cache in the relevant virtual volume stored in the migration source physical memory, and thereafter switching the data storage destination from thereon to the migration destination physical memory.

The change of concerned media can be realized by reading all the data in the virtual volume stored in the migration source physical media, writing the same to the migration destination physical media, and then changing the data access destination to the migration destination physical media. Further, the change of the concerned port can be realized by allowing access from the migration destination physical port, switching the access destination to the migration destination port by changing the setting of the host 100 manually, confirming access to the migration destination port, and prohibiting access to the migration source physical port.

The method for changing the concerned resource is not restricted to the above method, and can use other general methods. For example, the change of the concerned port can use a general method of installing an alternating path software to the host, notifying an access availability information of all the physical ports of the storage system to the alternating path software, and automatically switching the access to the migration source physical port to the migration destination physical port.

If a concerned resource candidate does not exist (1706), it sends an improvement incapable notice to the management server (1709), and requests improvement of resource shortage state by the management server. Then, confirmation is performed for all physical resources within the storage system (1708), and the relevant program is ended.

According to the relevant program, by detecting the resource shortage state of the physical resource and improving the resource shortage state by changing the concerned resource, it becomes possible to eliminate the risk of the target performance being unattained of the virtual storage.

According to the preferred embodiment described above, performance management of the virtual storage can be facilitated.

Further, the reallocation of resources is not restricted to the method described above. Various methods other than those described above can be adopted, as long as the method enables to raise the virtual resource utilization rate in a stepwise manner.

Figure 35:
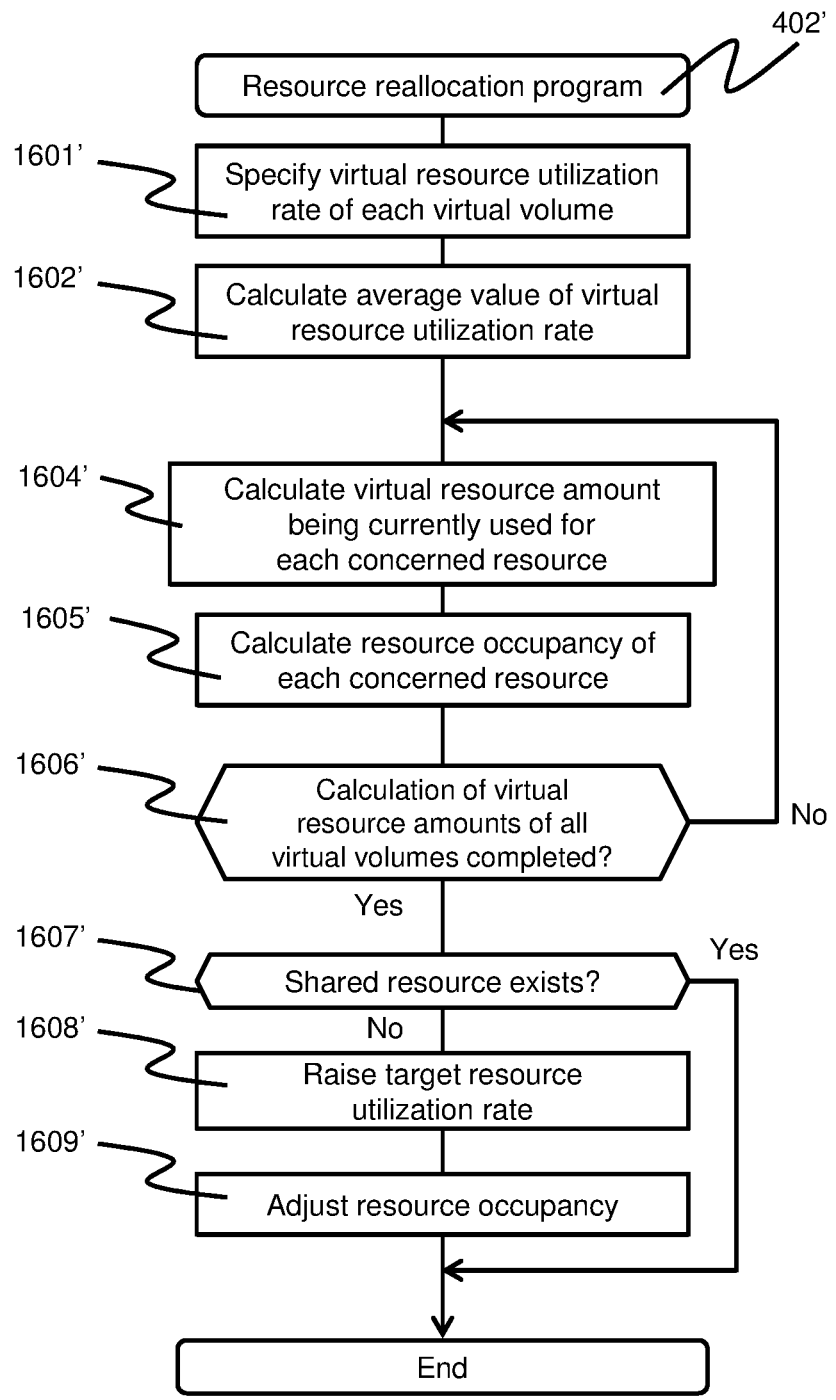
FIG. 35 is a modified example of a resource reallocation program.

FIG. 35 illustrates another example of a resource reallocation program. In order to distinguish from the resource reallocation program 402 illustrated in FIG. 16, the program illustrated in FIG. 35 is denoted as a resource reallocation program 402'.

In step 1601', the resource reallocation program 402' specifies the virtual resource utilization rate 1106 of the concerned resource of each virtual volume by using the values in the virtual resource amount management table 416 with respect to the respective virtual volumes 300 belonging to the virtual storage 200. Thereafter, the resource reallocation program 402 calculates an average value of the virtual resource utilization rates 1106 of the concerned resources of the respective virtual volumes for each resource classification (1602'). This process is the same as step 1602 of FIG. 16.

In step 1604', the resource reallocation program 402' calculates the currently used virtual resource amount for each concerned resource of the relevant virtual volume. The value can be calculated from the marginal resource amount 1003, and the resource occupancy 1104 and the virtual resource utilization rate 1106 managed by the virtual resource amount management table 416.

Next, in step 1605', the resource reallocation program 402' calculates the resource occupancy 1104 of each concerned resource by using the virtual resource amount calculated in step 1604', the average value of the virtual resource utilization rates calculated in step 1602 and the marginal resource amount 1003 of the concerned resource, and sets the same in the virtual resource amount management table 416. Specifically, the resource reallocation program 402' performs the following calculation for each concerned resource:

(virtual resource amount calculated in step 1604'÷average value of virtual resource utilization rates)÷marginal resource amount 1003 of concerned resource Steps 1606' through 1608' are the same as steps 1606 through 1608 of FIG. 16, so that the descriptions thereof are omitted.

In step 1609', similar to step 1609 of FIG. 16, the resource reallocation program 402' adjusts the resource occupancy 1104 of each concerned resource so that the virtual resource utilization rate 1106 of each concerned resource becomes equal to the value of the target resource utilization rate 504, sets the same in the virtual resource amount management table 416, and ends the process (1609). The calculation formula of the adjustment method is as follows:

(virtual resource amount calculated in step 1604'÷target resource utilization rate 504)÷marginal resource amount That is, according to the calculation formula used in step 1609 of FIG. 16, the virtual resource amount required for the virtual volume to achieve the target performance has been used, whereas step 1609' differs only in that instead of using this value, the virtual resource amount calculated in step 1604', that is, the virtual resource amount used at the current point of time, is used.

According to the resource reallocation program 402', the information related to the performance of the virtual volume is not used. However, if it is operated via a performance substantially close to the target performance, it is possible to adjust resource occupancy in each virtual volume using the resource reallocation program 402', similar to the resource reallocation program 402.

<Embodiment 2>

Hereafter, Embodiment 2 will be described. In Embodiment 2, we will describe the method for performing performance management of the relevant virtual storage according to a configuration where a concerned resource exists in each divided area within the virtual volume belonging to the virtual storage.

Figure 18:
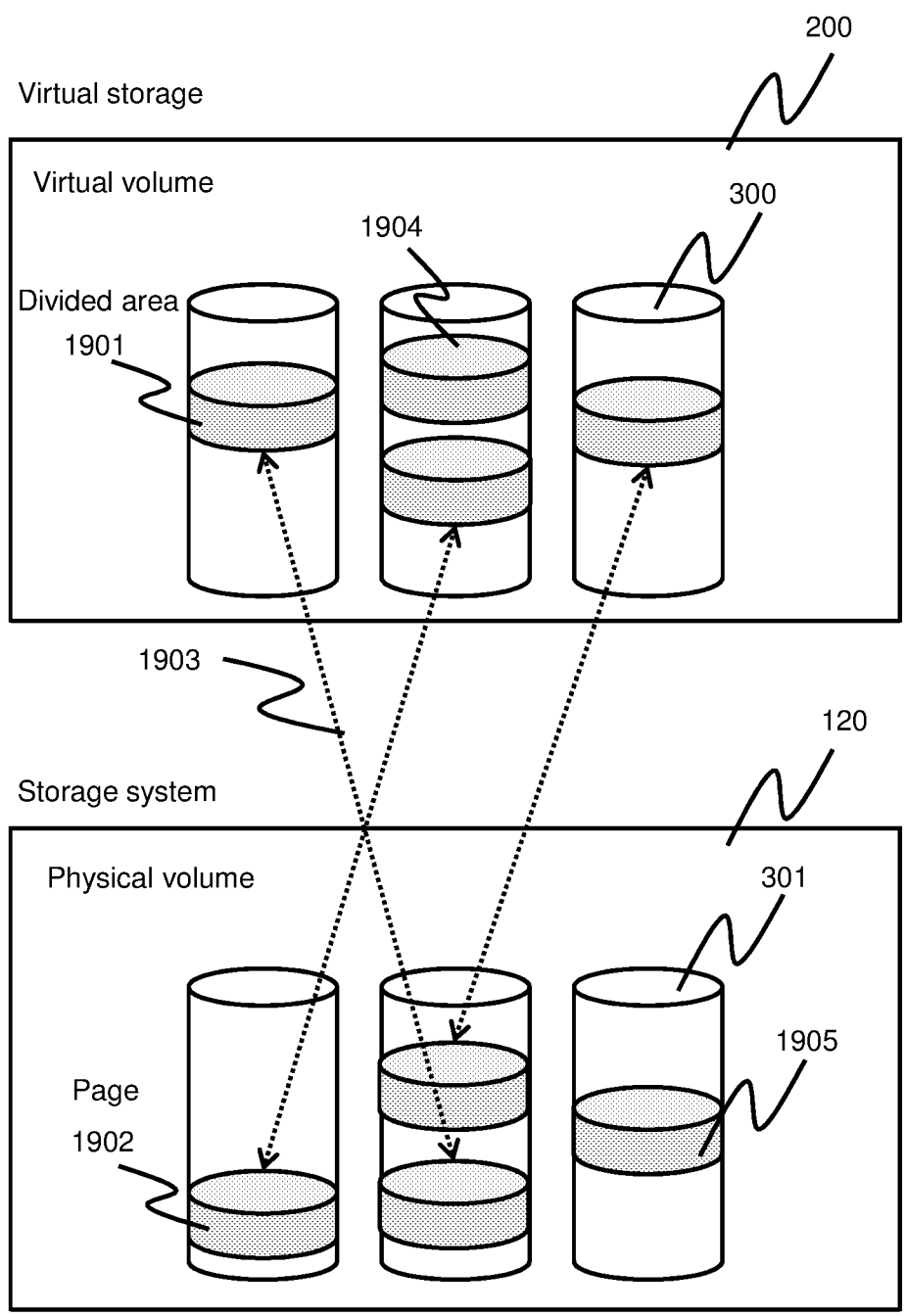
FIG. 18 is a configuration diagram of a virtual volume according to Embodiment 2.

FIG. 18 is a schematic diagram showing the corresponding relationship between the virtual volumes 300 and the physical volumes 301 according to embodiment 2. The corresponding relationship between the virtual volumes and physical volumes according to the present embodiment is managed by a fixed length unit which is finer than the volume. For convenience, a unit having divided the virtual volume into fixed lengths is called a divided area 1901, and a unit having divided the physical volume into fixed lengths is called a page 1902. Some divided areas and pages are not mutually associated (such as 1904 and 1905).

FIG. 19 shows one example of a virtual volume configuration management table 413. The virtual volume configuration management table of the present embodiment newly manages the corresponding relationship between the divided areas of the virtual volume and the pages of the physical volume. In order to manage the corresponding relationship between divided areas and pages, the virtual volume configuration management table manages a virtual LBA column 2203 showing the LBA range of each divided area and a physical LBA column 2205 showing the LBA range of each page. The description on the other columns will be omitted.

According to the present embodiment, thin provisioning technique is applicable. Thin provisioning technique is a technique for mapping a page to a divided area only when a write request is received from the host 100 to the relevant specific divided area. The capacity efficiency of the storage system can be improved by applying the relevant technique.

There may be a case where a page is not mapped to the divided area when the thin provisioning technique is applied to the virtual volume. Such a divided area is expressed by storing "N/A" in the physical LBA column in the virtual volume management table. Hereafter, the present embodiment is described of a case where the thin provisioning technique is applied.

Figure 20:
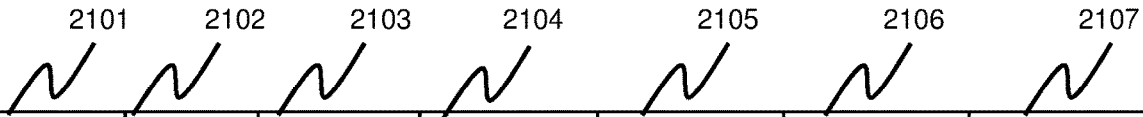
FIG. 20 is a configuration diagram of a physical volume configuration management table according to Embodiment 2.

FIG. 20 illustrates one example of a physical volume configuration management table 414. The physical volume configuration management table according to the present embodiment has a physical LBA column 2103 added thereto, and is capable of managing the concerned resources in each page. The descriptions of the other columns are omitted. According to the present embodiment, unlike Embodiment 1, it is assumed that the required numbers of physical volumes were created in advance.

FIG. 21 is an example of a virtual volume monitor table 415. The virtual volume monitor table of the present embodiment similarly has a virtual LBA column 2202 added thereto, and is capable of managing the performance value in each divided area. The descriptions of the other columns are omitted.

Figure 22:
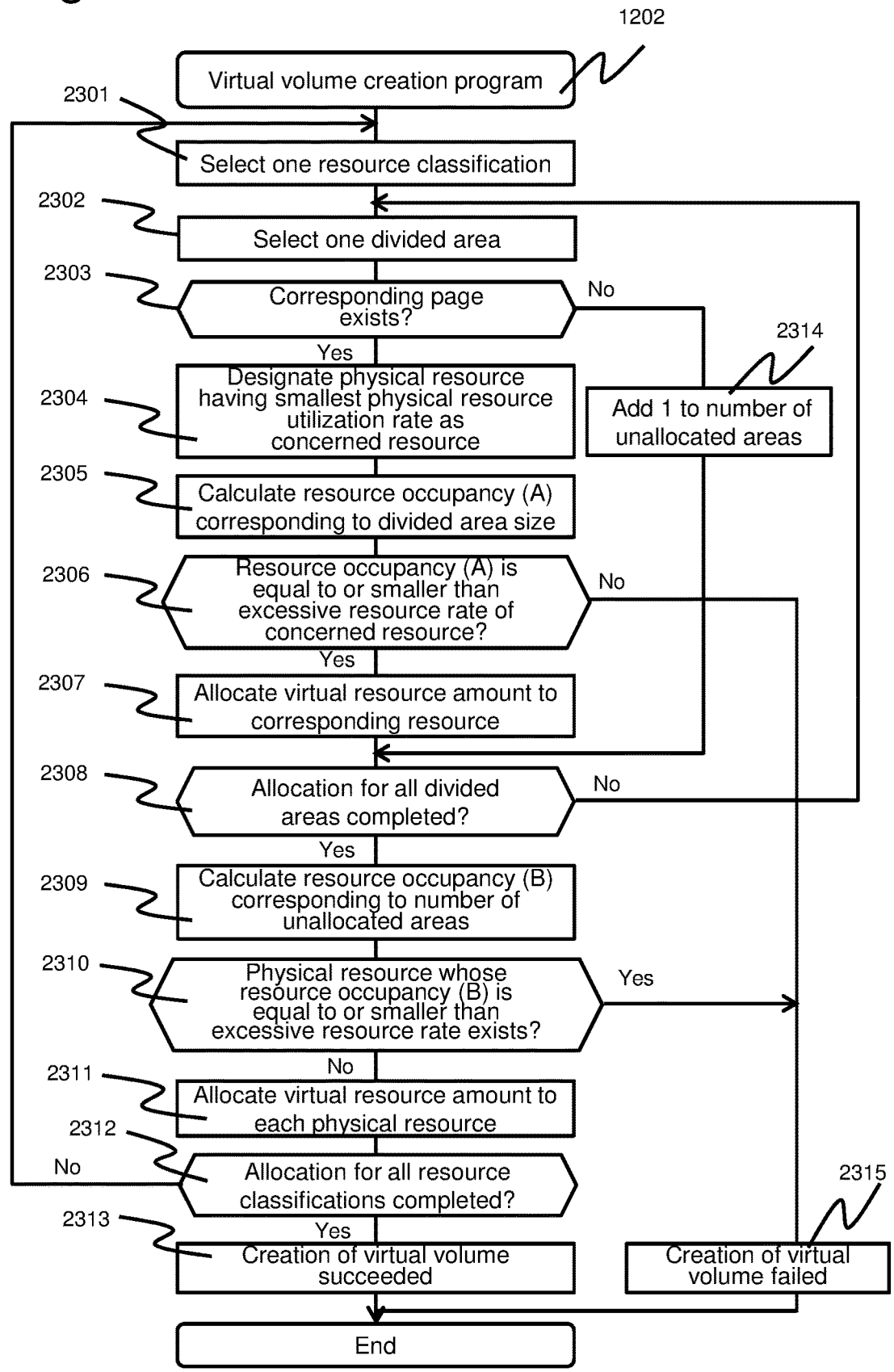
FIG. 22 is a configuration diagram of a virtual volume creation program according to Embodiment 2.

FIG. 22 shows one example of a virtual volume creation program 1202. In the present embodiment, at first, a concerned resource is determined for each divided area, and the processes of steps 2302 through 2308 are changed to allocate a virtual resource to the relevant concerned resource.

Especially according to the relevant embodiment, the method for allocating the virtual resource differs depending on whether a corresponding page exists or not in each divided area within the virtual volume. This is for determining a more appropriate concerned resource by determining the concerned resource of each divided area at the timing of determining a corresponding page.

In the relevant program, at first, whether a corresponding page exists in each divided area is judged (2303). If a corresponding page exists, the concerned resource is determined via a similar method as FIG. 13 (2304), and the resource occupancy 1104 is calculated (2305). In the relevant embodiment, the size of each divided area is a fixed length, and the resource occupancy is calculated by "(total amount of virtual resources)÷(total sum of number of divided areas of virtual volume belonging to relevant virtual storage)÷(marginal resource amount of concerned resource)". Thereafter, the allocation of virtual resource amount is performed to the concerned resource via a similar method as FIG. 13 (2306, 2307).

On the other hand, if a concerned page does not exist, the relevant divided area is temporarily counted as the number of unallocated areas (2314). After confirming that the judgement for all divided areas have been completed (2308), the resource occupancy corresponding to the number of unallocated areas is calculated by "(total amount of virtual resources)÷(total sum of number of divided areas of virtual volume belonging to relevant virtual storage)×(number of unallocated areas)÷(marginal resource amount of concerned resource)" (2309), and the resource occupancy corresponding to the number of unallocated areas is temporarily uniformly allocated to all physical resources belonging to the resource classification selected in step 2301 (2311).

Figure 23:
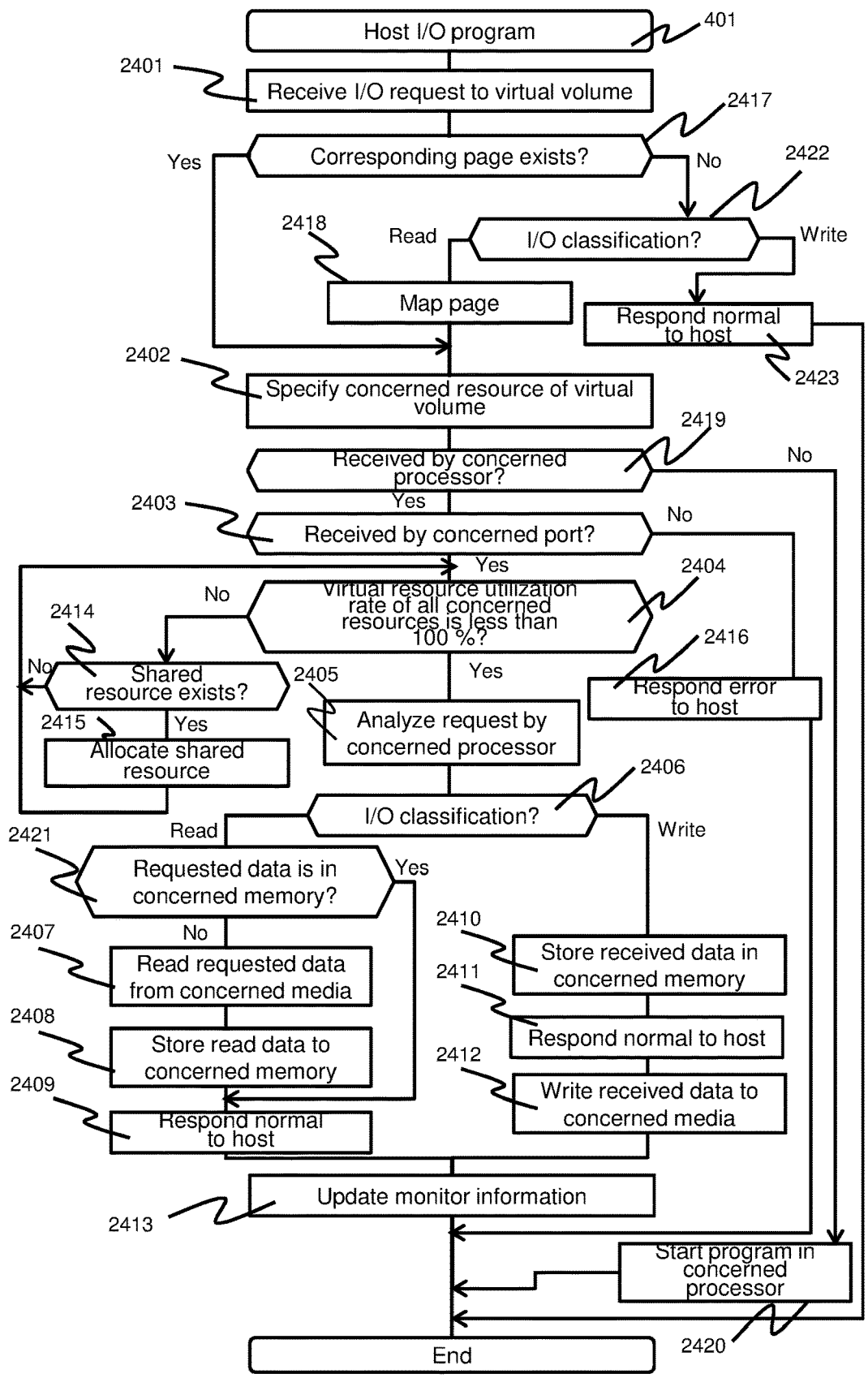
FIG. 23 is a configuration diagram of a host I/O program according to Embodiment 2.

FIG. 23 illustrates one example of the host I/O program 401. Similarly according to the host I/O program of the present embodiment, the processes are changed to specify the concerned resource for each divided area (2402). Further, along with the application of the thin provisioning technique, processes are added so as to map a page to a divided area only when a write request to the relevant divided area is received (steps 2417 and 2418).

As described earlier, the concerned resource of each divided area is determined at the timing when a page is mapped thereto. Therefore, step 2418 includes a concerned resource determination process regarding the relevant divided area, and an occupied resource amount setting process regarding the relevant concerned resource. The details of these processes are the same as the processes of steps 2304 through 2307 of FIG. 22, so the detailed description thereof is omitted.

Figure 24:
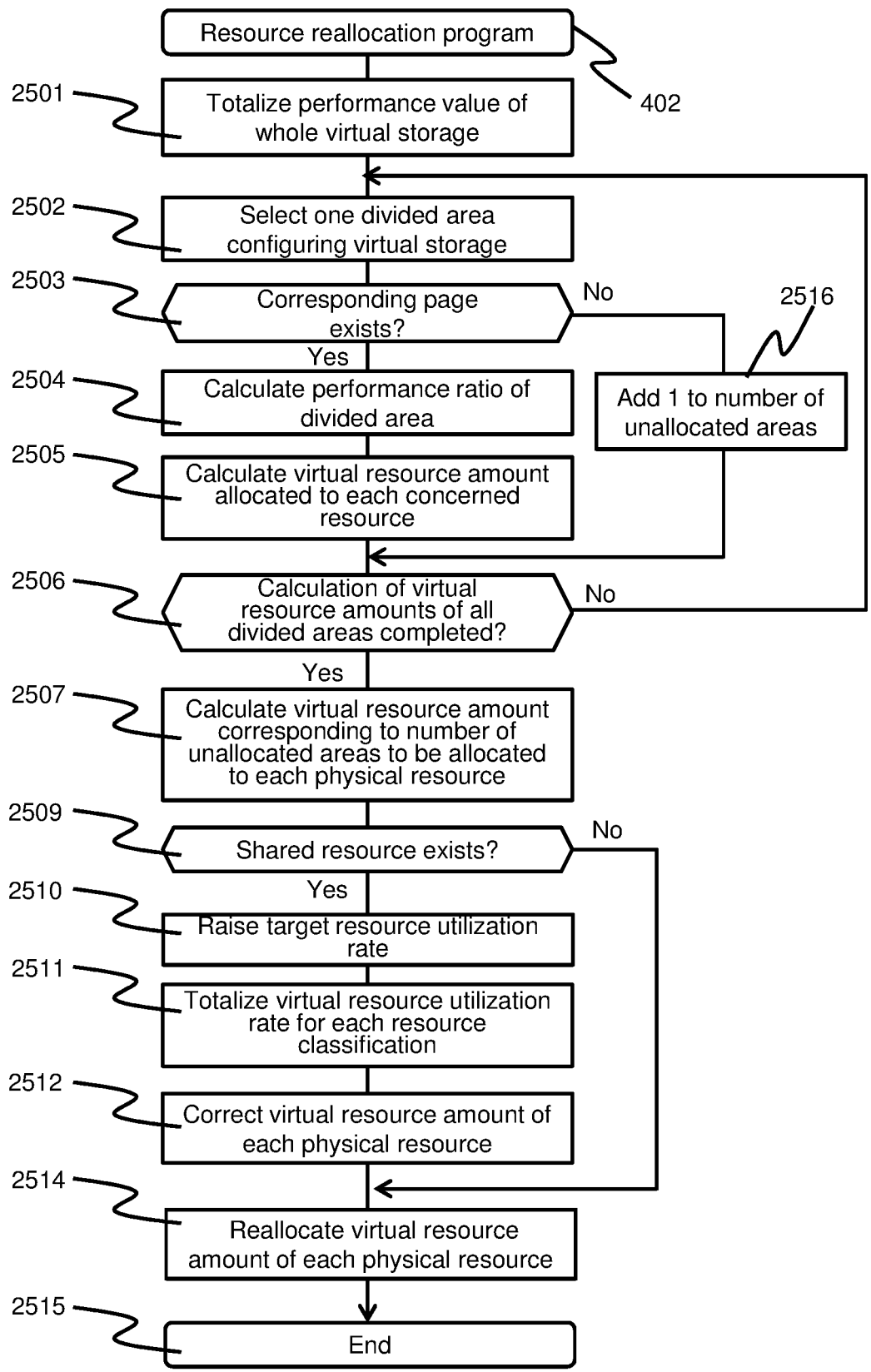
FIG. 24 is a configuration diagram of a resource reallocation program according to Embodiment 2.

FIG. 24 shows one example of the resource reallocation program 402. Similarly according to the resource reallocation program of the present embodiment, the processes are changed to determine the virtual resource amount of the concerned resource for each divided area (steps 2502 through 2506).

Further, similar to FIG. 22, it judges whether a corresponding page exists for each divided area (2503), and if the page doesn't exist, it counts the relevant divided areas as the number of unallocated areas (2516). After confirming that the judgement is completed for all divided areas (2506), the occupied resource amount corresponding to the number of unallocated areas is calculated (2507), and the occupied resource amount is temporarily uniformly allocated to all physical resources (2508).

Based on the storage control program and the storage management table described above, the performance of virtual storages can be managed even when a thin provisioning technique is applied to a configuration where the areas within the virtual volumes are managed in divided area units.

<Embodiment 3>

Hereafter, embodiment 3 will be described. In Embodiment 3, a method for managing the performance of the virtual storage is described in a configuration where a tiering technique is applied to the respective virtual volumes in addition to the configuration of Embodiment 2.

A tiering technique is a technique for mapping a page of a physical volume configured of different media classifications to various divided areas of a certain virtual volume. Further, it enables performance improvement of the virtual volume by automatically reallocating a divided area having a high throughput performance to a media classification having a high speed. In the present specification, the media classification having a high speed denotes the SSD 151.

FIG. 25 shows one example of a virtual storage configuration management table. The virtual storage configuration management table according to the present embodiment can designate a media classification in which the HDD 151 and the SSD exist in a mixture as virtual media 2705. The storage system automatically adjusts the occupied resource amount of HDD and the occupied resource amount of SSD via a tiering technique, and sets the occupied resource amount of SSD for achieving the target performance to a minimum necessary amount. The descriptions of other columns are omitted.

Figures 26, 27:
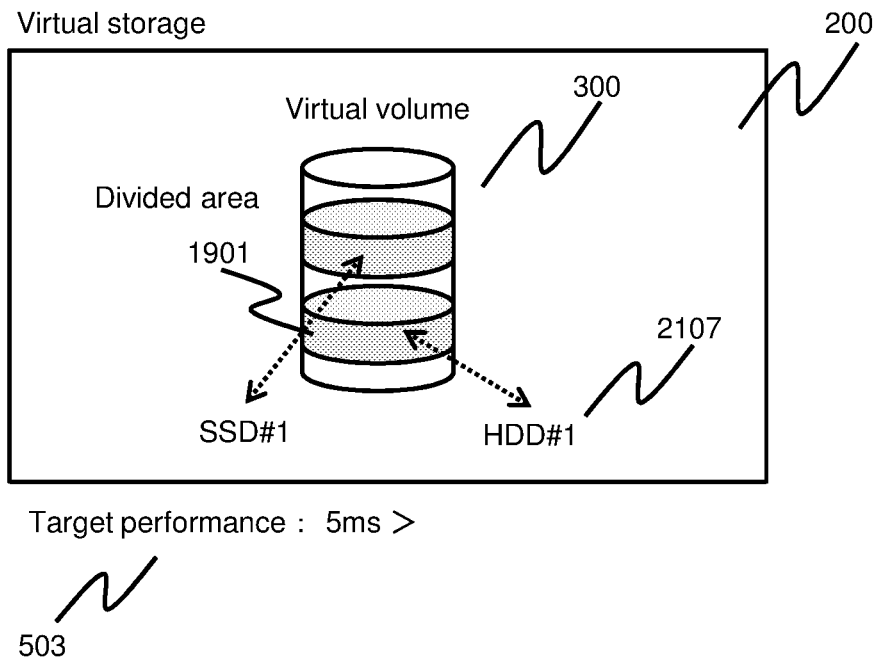
FIG. 26 is a schematic diagram of processing of a resource reallocation program according to Embodiment 3.
FIG. 27 is a schematic diagram (2) of processing of the resource reallocation program according to Embodiment 3.

FIGS. 26 and 27 are schematic diagrams of the processing of a resource allocation program 203 according to the present embodiment. In the example of FIG. 26, the virtual storage 200 has one virtual volume 300. The target performance of the relevant virtual storage is set to "less than 5 ms". Further, as shown in FIG. 27, concerned media 217 of the respective divided areas 1901 included in the virtual volume is either SSD #1 or HDD #1, wherein the total sum of throughput performances 2203 of the divided areas having SSD #1 as the concerned resource is 100 IOPS, and the total sum of throughput performances of the divided areas having HDD #1 as the concerned resource is 200 IOPS.

Now, assuming that the average response performance of SSD is 1 ms and the average response performance of HDD is 6 ms, the response performance of the relevant virtual storage can be calculated as approximately 4.3 ms. On the other hand, according to a minimum required configuration for achieving a target performance of less than 5 ms, the total sum of the throughput performances 2203 of the divided areas having SSD #1 as the concerned resource should be 60 IOPS and the total sum of the throughput performances of the divided areas having HDD #1 as the concerned resource should be 240 IOPS.

Therefore, the relevant program sets the resource allocation amount of SSD to the minimum necessary value, by selecting 40 IOPS worth of divided areas sequentially from those having smaller throughput performances among the divided areas where the concerned resource is SSD #1, and changing the concerned resource to HDD. The reason for selecting those having smaller throughput performances is to effectively utilize the capacity resource of SSD, and it is also possible to adopt different selection criteria as long as 40 IOPS worth of divided area(s) is/are selected.

Figure 28:
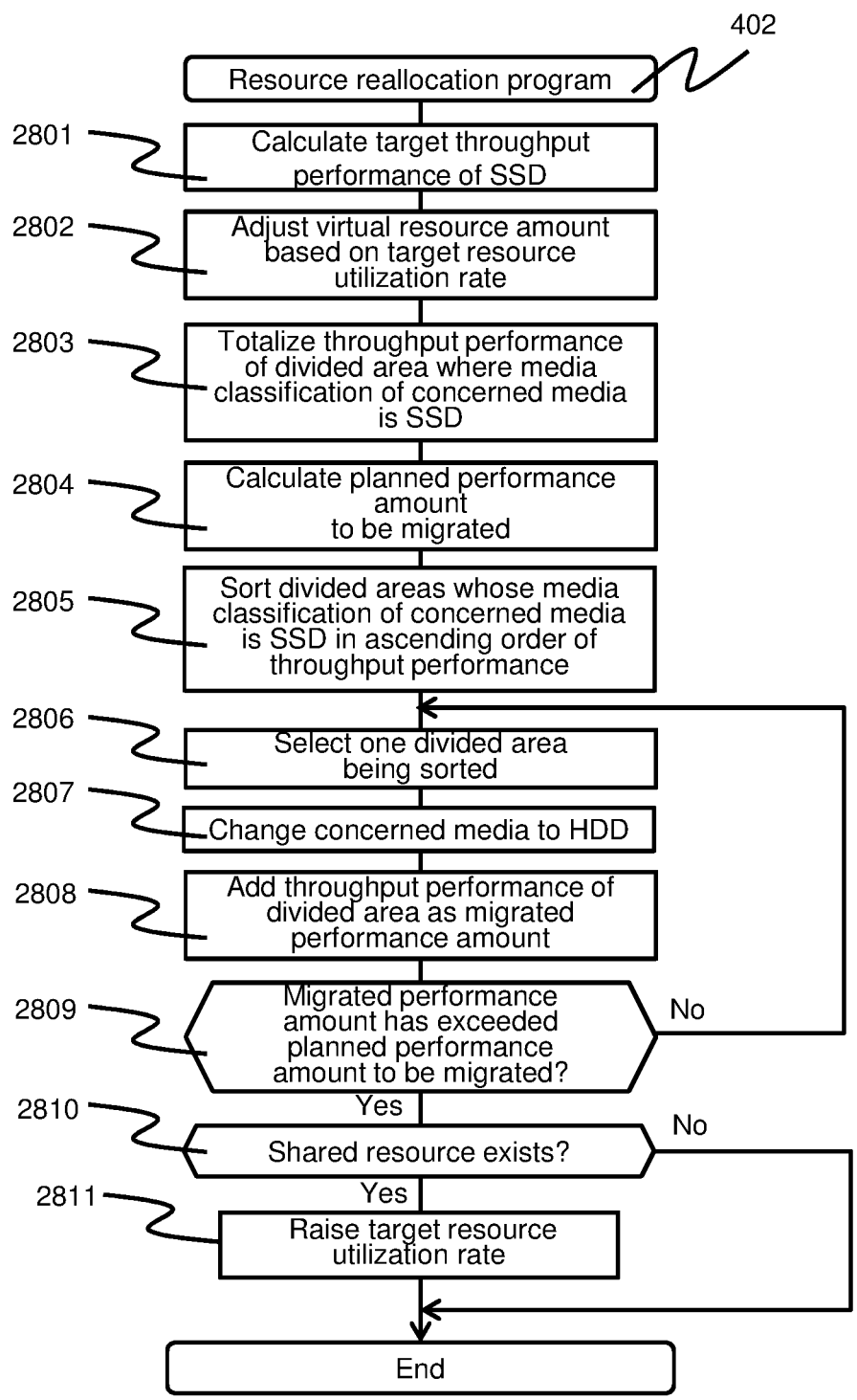
FIG. 28 is a configuration diagram of the resource reallocation program according to Embodiment 3.

FIG. 28 shows one example of the resource reallocation program 402. The resource reallocation program according to the present embodiment illustrates a method for reallocating resources of a case where response performances are set.

At first, the relevant program calculates a minimum necessary target throughput performance of the SSD to achieve the target performance (2801). One example of the calculation method of the relevant process is as illustrated in FIG. 27. Thereafter, based on the current target resource utilization rate, "target throughput performance÷target throughput performance of SSD" is calculated as a necessary virtual resource amount (2802). Thereafter, the relevant program totalizes the throughput performance of the divided area where the media classification of the concerned media is the SSD (2803), and by calculating the difference with the calculated virtual resource amount, calculates the amount of throughput performance required to be migrated to the HDD (planned performance amount to be migrated) (2804).

The present embodiment only illustrates a case where the concerned resource is changed from the SSD to the HDD, but calculation can be performed similarly of a case where the concerned resource is changed from the HDD to the SSD. Next, the divided areas whose media classification of concerned media is the SSD are sorted in order from those having lower throughput performances (2805), and the concerned media is changed from the SSD to the HDD in order starting from the divided area at the top of the list, corresponding to the planned performance amount to be migrated (2806 and 2807). The method illustrated in FIG. 17 can be applied as an example as the method for changing the concerned media.

Incidentally, the relevant program adds the throughput performance of the divided areas having the concerned media changed as a migrated performance amount (2808), and ends the process at a point of time when the migrated performance amount exceeds the planned performance amount to be migrated (2809).

Further, the relevant program adjusts the target resource utilization rate according to whether shared resources exist or not, similar to FIG. 16 (steps 2810 through 2812). According to the relevant program described above, the amount of resources of SSDs required to achieve the target performance can be set to a minimum necessary value.

Based on the storage control program and the storage management table described above, the performance of the virtual storage can be managed even when a tiering technique is applied to a configuration where the areas within the virtual volumes are managed in units of divided areas.

<Embodiment 4>

Embodiment 4 will be described below. Embodiment 4 illustrates a method for managing the performance of a virtual storage in a configuration where a storage function is applied to virtual volumes belonging to the virtual storage.

In the present embodiment, various storage functions can be applied to respective virtual volumes constituting the virtual storage. A storage function specifically refers to a volume copy function, a deduplication function, a compression function and so on. When applying a storage function to virtual volumes, adjusting the virtual resource amount is required depending on the state of the storage function since the virtual resource amount for achieving the target performance differs depending on the state of the storage function.

Figure 29:
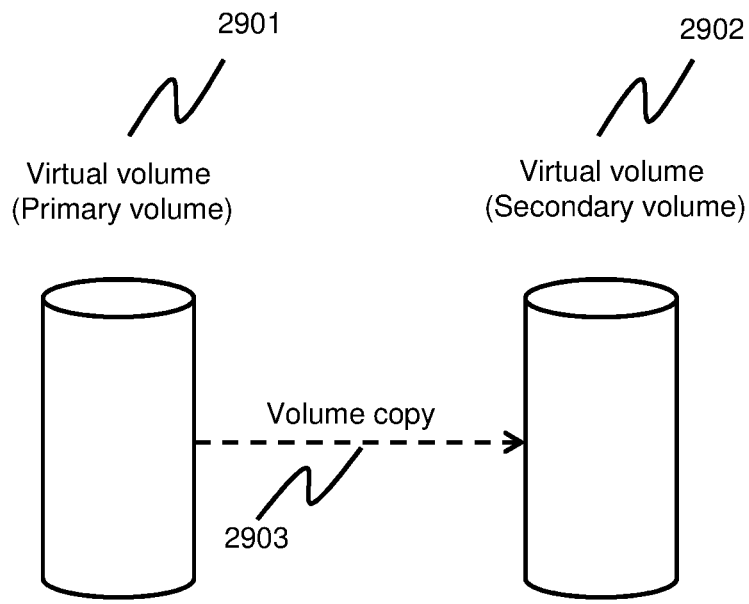
FIG. 29 is a schematic diagram of a volume copy function according to Embodiment 4.

FIG. 29 illustrates an outline of the volume copy function set as the target of the present embodiment. A volume copy function is a function for replicating a replica of data stored in a certain virtual volume 300 to a different virtual volume. In the present specification, a replication source virtual volume is referred to as a primary volume 2901 and a replication destination virtual volume is referred to as a secondary volume 2902 for distinction.

Figure 30:
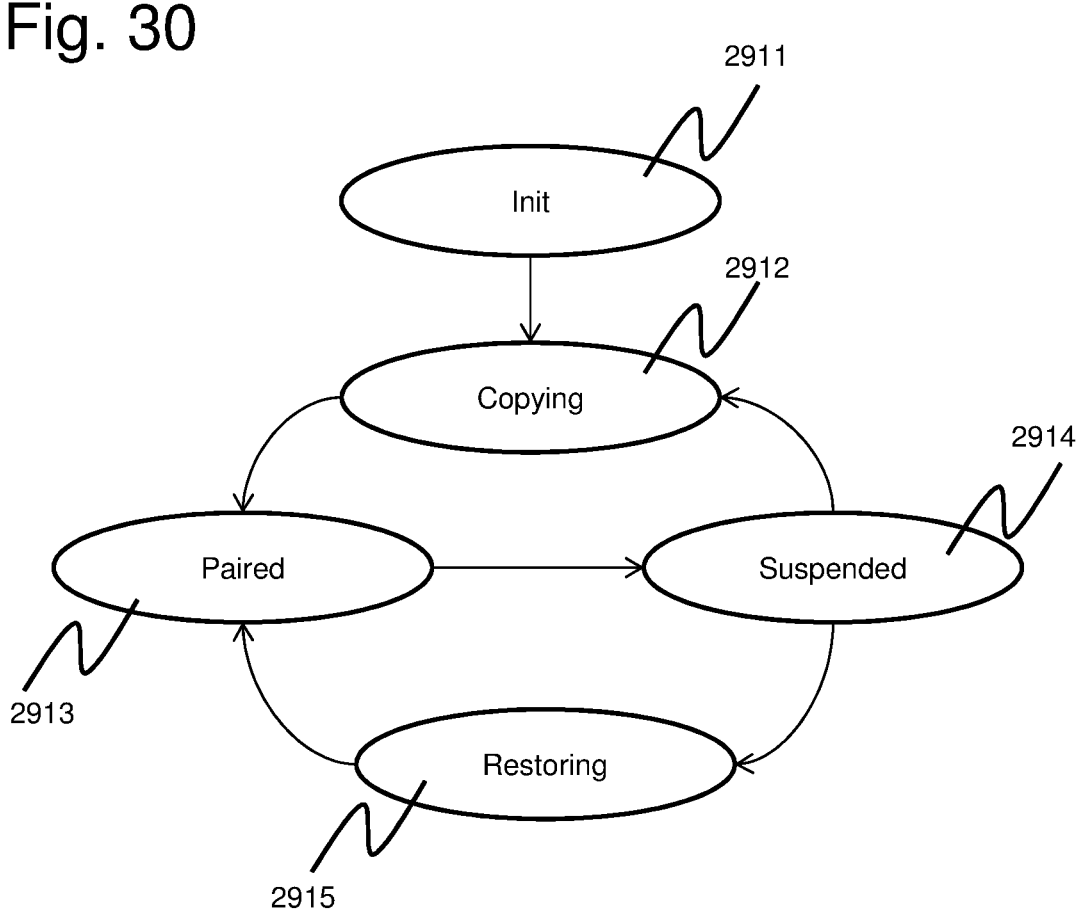
FIG. 30 is a state transition diagram of a volume copy function according to Embodiment 4.

The volume copy function has function states showing the state of creation of replica between the primary and secondary volumes. FIG. 30 illustrates one example of a state transition diagram of the states of the relevant function. "Init" refers to an initial state where a replica is not created (2911), and "Copying" refers to a midway state where data is being replicated from the primary volume to the secondary volume (2912).

"Paired" refers to a state where replica is maintained by writing a write request both to the primary volume and the secondary volume after completing replication of the data temporarily (2913), and "Suspended" refers to a state where the write request is only written in the primary volume and data difference portions with the secondary volume are recorded (2914). "Restoring" shows a state where the data of the data difference portions are being replicated from the secondary volume to the primary volume (2915).

Here, if the function state is set to Copying, the virtual resource amount for achieving the target performance in the secondary volume becomes higher compared to the Suspended state. That is, by performing control to add an appropriate virtual resource amount to the secondary volume when the state is changed from Suspended to Copying, the virtual resource amount can be set to the minimum necessary amount.

Figure 31:
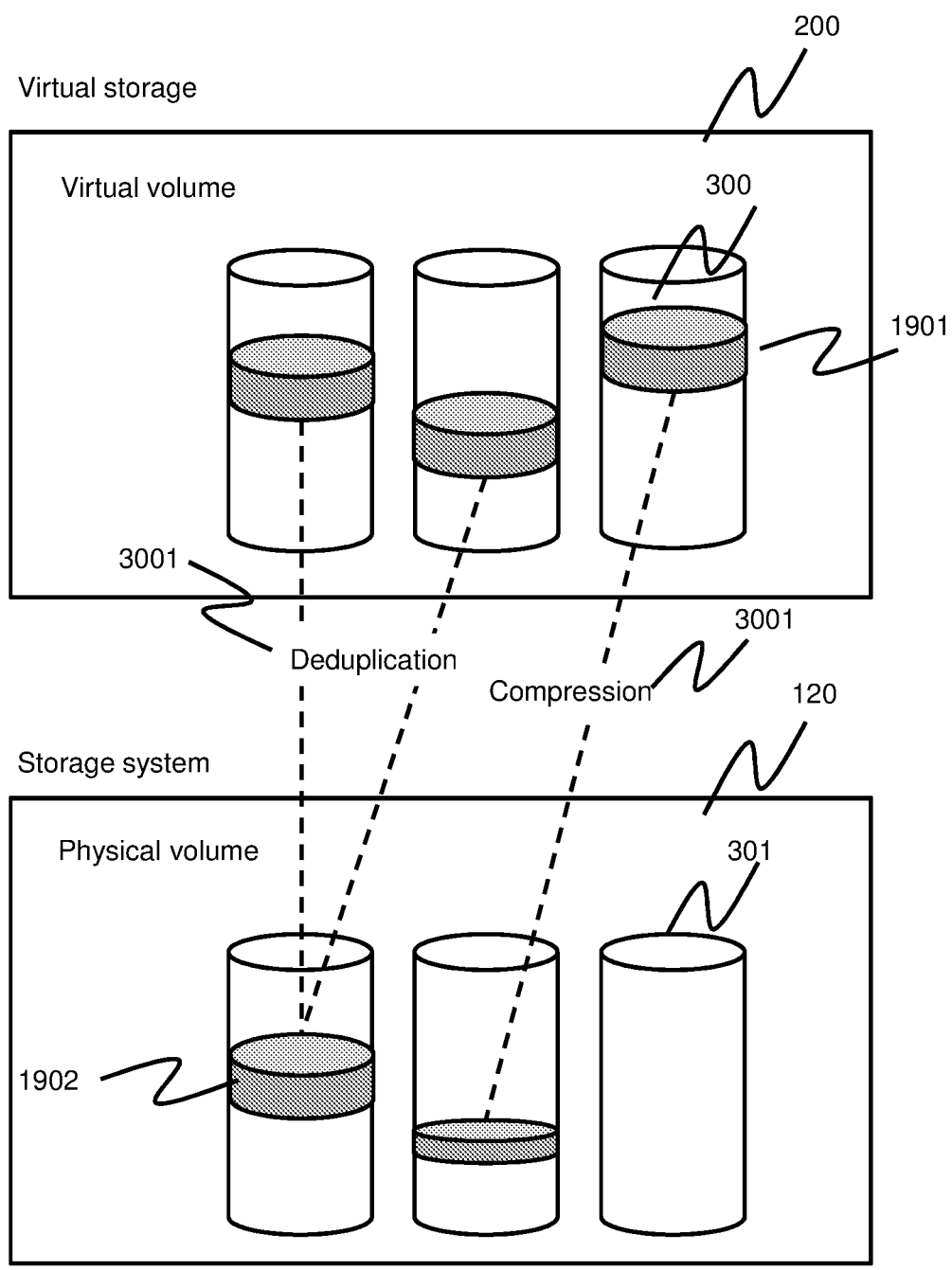
FIG. 31 is a schematic diagram of a deduplication function and a compression function according to Embodiment 4.

FIG. 31 illustrates an outline of the deduplication function and the compression function being the target of the present embodiment. A deduplication function is a function for mapping a shared page 1902 to divided areas 1901 storing the same storage data (deduplicating) with the aim to improve capacity efficiency. On the other hand, a compression function is a function for storing data having compressed the divided area to a page with the aim to improve capacity efficiency. It is possible to apply both deduplication and compression to the same divided area.

For example, if the compression function is applied here, compression processing and extension processing must be executed to the I/O regarding the relevant data, so that the virtual resource amount for achieving the target performance is increased. In other words, by performing control to add an appropriate virtual resource amount to the virtual volume at a timing when compression is executed, the physical resource amount to be allocated to the virtual volume can be set to the minimum necessary amount.

FIG. 32 shows an example of the storage function state management table 417. A function state management table is a table for managing classifications of functions applied to the respective virtual volumes 300 and the function states thereof. The function state management table includes, at least, a virtual volume number column 3101, a function classification column 3102, and a function state column 3103.

A classification of the function applied to the virtual volume is stored in the function classification column. In the present embodiment, values such as "volume copy (primary volume)", "volume copy (secondary volume)", "deduplication", "compression" or the like are stored.

A function state of the function provided by each function classification is stored in the function state column. In volume copy, states such as Init, Copying, or the like as shown in FIG. 30 are stored. Similarly, in deduplication, the ratio of the page being deduplicated within the divided areas included in the virtual volume is stored, and in compression, either "compressed" or "non-compressed" state is stored.

FIG. 33 illustrates one example of the storage function state correction table 418. A storage function state correction table is a table for managing a correction factor of the virtual resource amount when the storage function applied to the virtual volume 300 has been transited to a specific function state. The relevant table includes, at least, a function classification column 3201, a function state column 3202, a port correction factor column 3203, a processor correction factor column 3204, a memory correction factor column 3205, and a media correction factor column 3206.

The storage system 120 adjusts the virtual resource amount occupied by the virtual storage 200 via correction factors shown in columns 3203 through 3006. For example, if a volume copy (primary volume) is applied to a certain virtual volume belonging to the virtual storage, and the storage function state is transited to Copying, the correction factor is added to the resource occupancy calculated in step 1605 of the resource reallocation program 402 and correction is performed. For example, if the processor correction factor 3204 is 10%, after calculating the resource occupancy of the processor in step 1605, the calculated resource occupancy is multiplied by 1.1 to perform correction.

Figure 34:
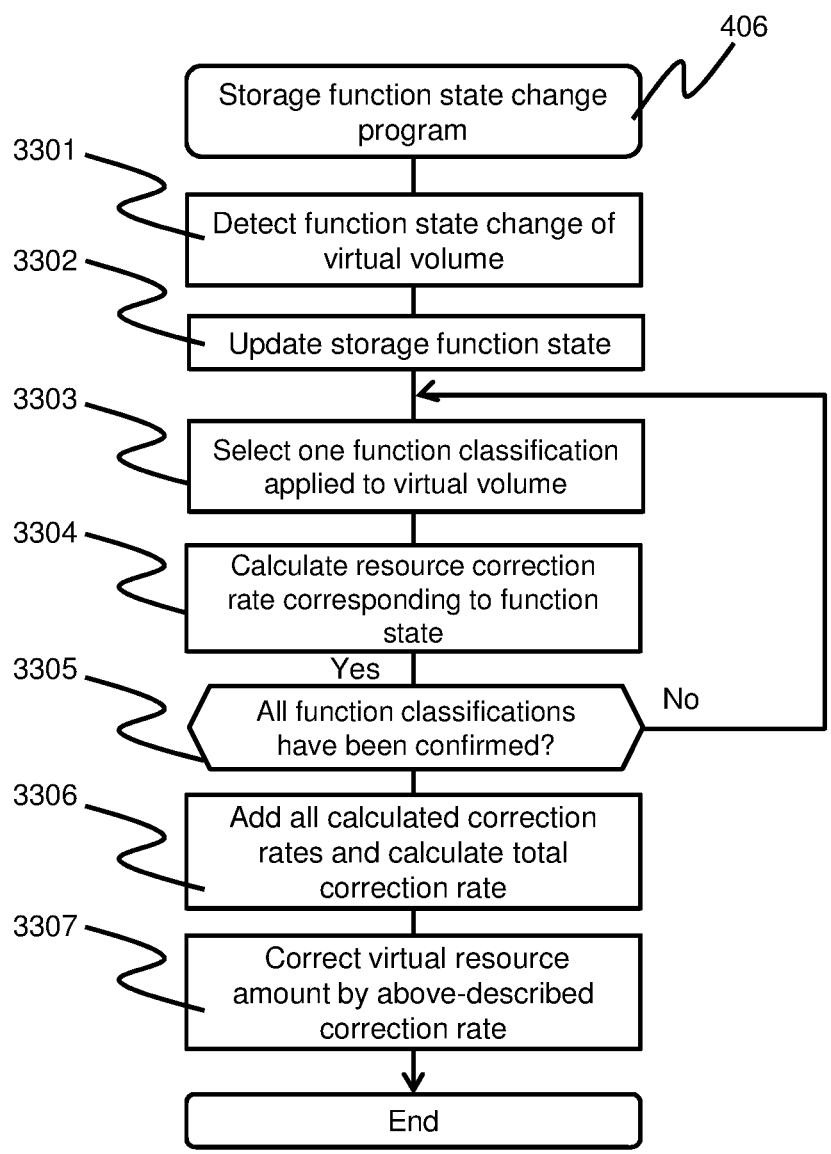
FIG. 34 is a configuration diagram of a storage function state change program according to Embodiment 4.

FIG. 34 illustrates one example of a storage function state change program 406. A storage function state change program is a program executed each time the storage function state of the virtual volume is changed, for correcting the resource occupancy in response to the changed storage function state.

At first, the storage function state change program detects change of function state of the virtual volume (3301), and updates the storage function state (3302). The change of function state generally occurs based on the requests from the management server 110, but according to function classifications, state change may occur when a command is received from the host 100 or by failure.

When the change of storage function state is detected, the relevant program selects one of the function classifications applied to the relevant virtual volume (3303), and based on the function state correction table 418, calculates the correction factor of each resource corresponding to the updated function state (3304). After calculating the correction factor of resources for all function classifications applied to the virtual volume (3305), the calculated correction factor of resources are all added and calculated as a total correction factor (3306). Lastly, the physical resource is corrected with respect to the virtual storage (3307). In the correction of step 3307, the correction described with reference to FIG. 33 is performed.

As described, even when a storage function is applied to each virtual volume belonging to the virtual storage, the resource allocation amount is changed according to the function state, so that it becomes possible to allocate the minimum necessary amount of physical resources.

The preferred embodiments of the present invention have been described above, but the present invention is not restricted to the described embodiments. Those skilled in the art can easily change, add, or replace the various components illustrated in the preferred embodiments within the scope of the present invention.

A portion or all of the components, functions, processing units, processing means and so on described above can be realized via hardware, such as by designing an integrated circuit. The information such as programs, tables and files for realizing the respective functions can be stored in a storage device such as a nonvolatile semiconductor memory, a hard disk drive or an SSD (Solid State Drive), or a non-transitory computer readable data storage medium such as an IC card, an SD card or a DVD.

REFERENCE SIGNS LIST

100 Host
110 Management server
120 Storage system
130 Data network
140 Storage controller
150 Media

The invention claimed is:

1. A storage system comprising a storage controller having multiple types of physical resources used for processing I/O requests from a host, and a media resource for storing data;
    the multiple types of physical resources including, at least, a processor resource, a memory resource, and a port resource connected to the host;
    the storage system being configured to be able to create one or more virtual storage subsystems to which virtual resources having logically divided a processing capacity of the physical resources are allocated, wherein when a virtual storage subsystem of the one or more virtual storage subsystems creates a virtual volume for receiving I/O requests from the host within the virtual storage subsystem, the virtual storage subsystem allocates a virtual resource of the virtual resources to the virtual volume based on a target performance and a target resource utilization rate of the virtual volume, wherein when the virtual storage subsystem receives an I/O request to the virtual volume from the host, the virtual storage subsystem performs processing related to the I/O request using the virtual resource having been allocated, and wherein after allocating the virtual resource to the virtual volume, the storage system changes the virtual resource having been allocated to the virtual volume based on the target performance and the target resource utilization rate, and concurrently raises the target resource utilization rate in a stepwise manner, wherein the storage system allocates the virtual resource to the virtual volume based on a ratio of volume size of the virtual volume and a total value of size of all volumes in the virtual storage subsystem, and wherein after allocating the virtual resource to the virtual volume, prior to raising the target resource utilization rate in a stepwise manner, the storage system is configured to:

A) calculate an average value of utilization rates of the virtual resources allocated to respective virtual volumes within the virtual storage subsystem;

B) calculate a virtual resource amount of the virtual resource required to achieve the target performance, based on a performance of the respective virtual volumes at a current point of time, a predetermined target performance, and a resource amount of the virtual resource being used at the current point of time; and C) determine a ratio of resource amount to be allocated to the virtual volume from the physical resources by calculating the following:

(the virtual resource amount required to achieve the target performance)÷(the average value of utilization rates of the virtual resources)÷(a maximum processing capacity of the physical resources).

2. The storage system according to claim 1, wherein when raising the target resource utilization rate in a stepwise manner, the storage system is configured to:

D) calculate the target resource utilization rate by adding a predetermined amount to the average value of utilization rates of the virtual resources; and E) determine a ratio of resource amount to be allocated to the virtual volume from the physical resources by calculating the following:

the virtual resource amount required to achieve the target performance÷the target resource utilization rate÷the maximum processing capacity of the physical resource.

3. A storage system comprising a storage controller having multiple types of physical resources used for processing I/O requests from a host, and a media resource for storing data;

the multiple types of physical resources including, at least, a processor resource, a memory resource, and a port resource connected to the host;

the storage system being configured to be able to create one or more virtual storage subsystems to which virtual resources having logically divided a processing capacity of the physical resources are allocated, wherein when a virtual storage subsystem of the one or more virtual storage subsystems creates a virtual volume for receiving I/O requests from the host within the virtual storage subsystem, the virtual storage subsystem allocates a virtual resource of the virtual resources to the virtual volume based on a target performance and a target resource utilization rate of the virtual volume, wherein when the virtual storage subsystem receives an I/O request to the virtual volume from the host, the virtual storage subsystem performs processing related to the I/O request using the virtual resource having been allocated, wherein after allocating the virtual resource to the virtual volume, the storage system changes the virtual resource having been allocated to the virtual volume based on the target performance and the target resource utilization rate, and concurrently raises the target resource utilization rate in a stepwise manner, wherein the storage system allocates the virtual resource to the virtual volume based on a ratio of volume size of the virtual volume and a total value of size of all volumes in the virtual storage subsystem, wherein after allocating the virtual resource to the virtual volume, prior to raising the target resource utilization rate in a stepwise manner, the storage system is configured to:

A) calculate an average value of utilization rates of the virtual resources allocated to the respective virtual volumes within the virtual storage subsystem; and B) determine a ratio of resource amount to be allocated to the virtual volume from the physical resources by calculating the following:

an amount of resource of the virtual resource being used at the current point of time÷the average value of utilization rates of the virtual resources÷the maximum processing capacity of the physical resources.

4. The storage system according to claim 3, wherein when raising the target resource utilization rate in a stepwise manner, the storage system is configured to:

C) calculate the target resource utilization rate by adding a predetermined amount to an average value of the virtual resource utilization rates; and D) determine a ratio of resource amount to be allocated to the virtual volume from the physical resources by calculating the following:

the amount resource of the virtual resource being used at the current point of time÷the average value of utilization rates of the virtual resources÷the maximum processing capacity of the physical resource.

5. A method for controlling a storage system comprising a storage controller having multiple types of physical resources used for processing I/O requests from a host, and a media resource for storing data;

the multiple types of physical resources including, at least, a processor resource, a memory resource, and a port resource connected to the host; and the storage system being configured to be able to create one or more virtual storage subsystems to which virtual resources having logically divided a processing capacity of the physical resources are allocated, the method comprising the steps of:

upon creating a virtual volume for receiving I/O requests from the host within a virtual storage subsystem of the one or more virtual storage subsystems, allocating a virtual resource of the virtual resources to the virtual volume based on a target performance and a target resource utilization rate of the virtual volume, and when an I/O request to the virtual volume is received from the host, performing processing related to the I/O request using the virtual resource having been allocated;

after allocating the virtual resource to the virtual volume, changing the virtual resource having been allocated to the virtual volume based on the target performance and the target resource utilization rate, and concurrently raising the target resource utilization rate in a stepwise manner;

allocating the virtual resource to the virtual volume based on a ratio of volume size of the virtual volume and a total value of size of all volumes of the virtual storage subsystem; and after allocating the virtual resource to the virtual volume, prior to raising the target resource utilization rate of the virtual resource allocated to the virtual volume in a stepwise manner, the method further comprising the steps of:

A) calculating an average value of utilization rates of the virtual resources allocated to respective virtual volumes within the virtual storage subsystem;

B) calculating a virtual resource amount of the virtual resource required to achieve the target performance, based on a performance of the respective virtual volumes at a current point of time and a determined target performance, and a resource amount of the virtual resource being used at the current point of time; and C) determining a ratio of resource amount to be allocated to the virtual volume from the physical resources by calculating the following:

(the virtual resource amount required to achieve the target performance)÷(the average value of utilization rates of the virtual resources)÷(a maximum processing capacity of the physical resources).

6. The method for controlling a storage system according to claim 5, wherein when raising the target resource utilization rate in a stepwise manner, the method further comprises the steps of:

D) calculating the target resource utilization rate by adding a predetermined amount to an average value of the virtual resource utilization rates; and E) determining a ratio of resource amount to be allocated to the virtual volume from the physical resources by calculating the following: (the virtual resource amount required to achieve the target performance)÷(the average value of utilization rates of the virtual resources)÷(a maximum processing capacity of the physical resources).

* * * * *